(12) United States Patent
Nam et al.

(10) Patent No.: US 11,671,962 B2
(45) Date of Patent: Jun. 6, 2023

(54) SWITCHING GAP BASED RATE MATCHING

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Juan Montojo, San Diego, CA (US); Arumugam Chendamarai Kannan, San Diego, CA (US); Zhifei Fan, San Diego, CA (US); Sungwoo Park, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/225,867

(22) Filed: Apr. 8, 2021

(65) Prior Publication Data

US 2021/0321436 A1     Oct. 14, 2021

Related U.S. Application Data

(60) Provisional application No. 63/007,732, filed on Apr. 9, 2020, provisional application No. 63/007,890, filed on Apr. 9, 2020.

(51) Int. Cl.
*H04W 72/12* (2009.01)
*H04W 16/28* (2009.01)
(Continued)

(52) U.S. Cl.
CPC ....... *H04W 72/1273* (2013.01); *H04L 1/0068* (2013.01); *H04L 5/0051* (2013.01);
(Continued)

(58) Field of Classification Search
CPC ............. H04W 16/28; H04W 72/1273; H04W 72/1263; H04W 72/1205; H04W 72/12;
(Continued)

(56) References Cited

U.S. PATENT DOCUMENTS 11,206,596 B2 * 12/2021 Chen ...................... H04W 36/36
11,411,690 B2 * 8/2022 Moon ................... H04L 1/1896
(Continued)

FOREIGN PATENT DOCUMENTS

CA       3060845 A1 *  5/2020  ........... H04B 7/0695
CN    110637488 A  * 12/2019  .......... H04J 11/0073

*Primary Examiner* — Phong La
(74) *Attorney, Agent, or Firm* — Harrity & Harrity, LLP

(57) ABSTRACT

Various aspects of the present disclosure generally relate to wireless communication. In some aspects, a user equipment may receive scheduling information that schedules a shared channel that is associated with a first beamforming configuration; determine that a gap between the shared channel and a resource associated with a second beamforming configuration fails to satisfy a threshold, wherein the UE is configured to monitor the resource associated with the second beamforming configuration; and modify at least one of the gap to satisfy the threshold or the second beamforming configuration to match the first beamforming configuration based at least in part on determining that the gap fails to satisfy the threshold. Numerous other aspects are provided.

30 Claims, 14 Drawing Sheets

(51) Int. Cl.
*H04W 72/04* (2009.01)
*H04L 1/00* (2006.01)
*H04W 72/1273* (2023.01)
*H04L 5/00* (2006.01)
*H04W 72/0446* (2023.01)
*H04W 72/0453* (2023.01)

(52) U.S. Cl.
CPC ....... *H04W 16/28* (2013.01); *H04W 72/0446* (2013.01); *H04W 72/0453* (2013.01); *H04W 72/1257* (2013.01)

(58) Field of Classification Search
CPC ......... H04W 72/1257; H04W 72/1242; H04W 72/0446; H04W 72/0453; H04W 72/046; H04W 72/044; H04W 72/04; H04L 1/0068; H04L 1/0067; H04L 1/0013; H04L 1/08; H04L 5/0051
See application file for complete search history.

(56) References Cited

U.S. PATENT DOCUMENTS

| | | | |
|---|---|---|---|
| 11,412,568 B2* | 8/2022 | Babaei | H04W 76/38 |
| 2019/0124694 A1* | 4/2019 | Chendamarai Kannan | H04W 74/0816 |
| 2019/0254045 A1* | 8/2019 | Sadiq | H04B 7/0617 |
| 2020/0053776 A1* | 2/2020 | John Wilson | H04L 5/001 |
| 2020/0266928 A1* | 8/2020 | Yeo | H04L 5/0092 |
| 2020/0328849 A1* | 10/2020 | Noh | H04W 72/042 |
| 2020/0367183 A1* | 11/2020 | Kim | H04L 27/26025 |
| 2021/0021330 A1* | 1/2021 | Khoshnevisan | H04L 27/2602 |
| 2021/0195600 A1* | 6/2021 | Khoshnevisan | H04W 72/0493 |
| 2021/0321436 A1* | 10/2021 | Nam | H04B 7/0617 |

* cited by examiner

SWITCHING GAP BASED RATE MATCHING

CROSS-REFERENCE TO RELATED APPLICATION

This Patent application claims priority to U.S. Provisional Patent Application No. 63/007,890, filed on Apr. 9, 2020, entitled "SWITCHING GAP BASED RATE MATCHING," and to U.S. Provisional Patent Application No. 63/007,732, filed on Apr. 9, 2020, entitled "GAP BASED SHARED CHANNEL MAPPING," both assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for switching gap based rate matching and shared channel mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving scheduling information that schedules a shared channel that is associated with a first beamforming configuration; determining that a gap between the shared channel and a resource associated with a second beamforming configuration fails to satisfy a threshold, wherein the UE is configured to monitor the resource associated with the second beamforming configuration; and modifying at least one of the gap to satisfy the threshold or the second beamforming configuration to match the first beamforming configuration based at least in part on determining that the gap fails to satisfy the threshold.

In some aspects, a method of wireless communication, performed by a base station, may include transmitting scheduling information that schedules a shared channel that is associated with a first beamforming configuration, wherein a gap between the shared channel and a resource associated with a second beamforming configuration fails to satisfy a threshold; modifying at least one of the gap to satisfy the threshold or the first beamforming configuration to match the second beamforming configuration based at least in part on determining that the gap fails to satisfy the threshold; and transmitting the shared channel in accordance with at least one of the modified gap or the modified first beamforming configuration.

In some aspects, a user equipment for wireless communication may include a memory and one or more processors coupled to the memory. The memory and the one or more processors may be configured to receive scheduling information that schedules a shared channel that is associated with a first beamforming configuration; determine that a gap between the shared channel and a resource associated with a second beamforming configuration fails to satisfy a threshold, wherein the UE is configured to monitor the resource associated with the second beamforming configuration; and modify at least one of the gap to satisfy the threshold or the second beamforming configuration to match the first beamforming configuration based at least in part on determining that the gap fails to satisfy the threshold.

In some aspects, a base station for wireless communication may include a memory and one or more processors coupled to the memory. The memory and the one or more processors may be configured to transmit scheduling information that schedules a shared channel that is associated with a first beamforming configuration, wherein a gap between the shared channel and a resource associated with a second beamforming configuration fails to satisfy a threshold; modify at least one of the gap to satisfy the threshold or the first beamforming configuration to match the second beamforming configuration based at least in part on determining that the gap fails to satisfy the threshold; and transmit the shared channel in accordance with at least one of the modified gap or the modified first beamforming configuration.

In some aspects, a non-transitory computer-readable medium may store one or more instructions for wireless communication. The one or more instructions, when executed by one or more processors of a UE, may cause the one or more processors to receive scheduling information that schedules a shared channel that is associated with a first beamforming configuration; determine that a gap between the shared channel and a resource associated with a second beamforming configuration fails to satisfy a threshold, wherein the UE is configured to monitor the resource associated with the second beamforming configuration; and modify at least one of the gap to satisfy the threshold or the second beamforming configuration to match the first beamforming configuration based at least in part on determining that the gap fails to satisfy the threshold.

In some aspects, a non-transitory computer-readable medium may store one or more instructions for wireless communication. The one or more instructions, when executed by one or more processors of a base station, may cause the one or more processors to transmit scheduling information that schedules a shared channel that is associated with a first beamforming configuration, wherein a gap between the shared channel and a resource associated with a second beamforming configuration fails to satisfy a threshold; modify at least one of the gap to satisfy the threshold or the first beamforming configuration to match the second beamforming configuration based at least in part on determining that the gap fails to satisfy the threshold; and transmit the shared channel in accordance with at least one of the modified gap or the modified first beamforming configuration.

In some aspects, an apparatus for wireless communication may include means for receiving scheduling information that schedules a shared channel that is associated with a first beamforming configuration; means for determining that a gap between the shared channel and a resource associated with a second beamforming configuration fails to satisfy a threshold, wherein the apparatus is configured to monitor the resource associated with the second beamforming configuration; and means for modifying at least one of the gap to satisfy the threshold or the second beamforming configuration to match the first beamforming configuration based at least in part on determining that the gap fails to satisfy the threshold.

In some aspects, an apparatus for wireless communication may include means for transmitting scheduling information that schedules a shared channel that is associated with a first beamforming configuration, wherein a gap between the shared channel and a resource associated with a second beamforming configuration fails to satisfy a threshold; means for modifying at least one of the gap to satisfy the threshold or the first beamforming configuration to match the second beamforming configuration based at least in part on determining that the gap fails to satisfy the threshold; and means for transmitting the shared channel in accordance with at least one of the modified gap or the modified first beamforming configuration.

In some aspects, a method of wireless communication, performed by a base station, may include mapping one or more demodulation reference signals (DMRSs) to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; mapping data of the shared channel to the one or more segments; and transmitting the one or more segments of the shared channel.

In some aspects, a method of wireless communication, performed by a user equipment, may include receiving or transmitting one or more DMRSs on one or more segments of a shared channel, wherein the shared channel is divided into two or more segments by a rate matching resource associated with a beam switching gap between a control channel and the shared channel, and wherein the mapping is based at least in part on respective quantities of symbols of the one or more segments; receiving data of the shared channel on the one or more segments; and processing the data of the shared channel.

In some aspects, a base station for wireless communication may include a memory and one or more processors coupled to the memory. The memory and the one or more processors may be configured to map one or more DMRSs to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; map data of the shared channel to the one or more segments; and transmit the one or more segments of the shared channel.

In some aspects, a user equipment for wireless communication may include a memory and one or more processors coupled to the memory. The memory and the one or more processors may be configured to receive or transmit one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments; receive data of the shared channel on the one or more segments; and process the data of the shared channel.

In some aspects, a non-transitory computer-readable medium may store one or more instructions for wireless communication. The one or more instructions, when executed by one or more processors of a base station, may cause the one or more processors to map one or more DMRSs to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; map data of the shared channel to the one or more segments; and transmit the one or more segments of the shared channel.

In some aspects, a non-transitory computer-readable medium may store one or more instructions for wireless communication. The one or more instructions, when executed by one or more processors of a user equipment, may cause the one or more processors to receive or transmit one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments; receive data of the shared channel on the one or more segments; and process the data of the shared channel.

In some aspects, an apparatus for wireless communication may include means for mapping one or more DMRSs to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; means for mapping data of the shared channel to the one or more segments; and means for transmitting the one or more segments of the shared channel.

In some aspects, an apparatus for wireless communication may include means for receiving one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments; means for receiving data of the shared channel on the one or more segments; and means for processing the data of the shared channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
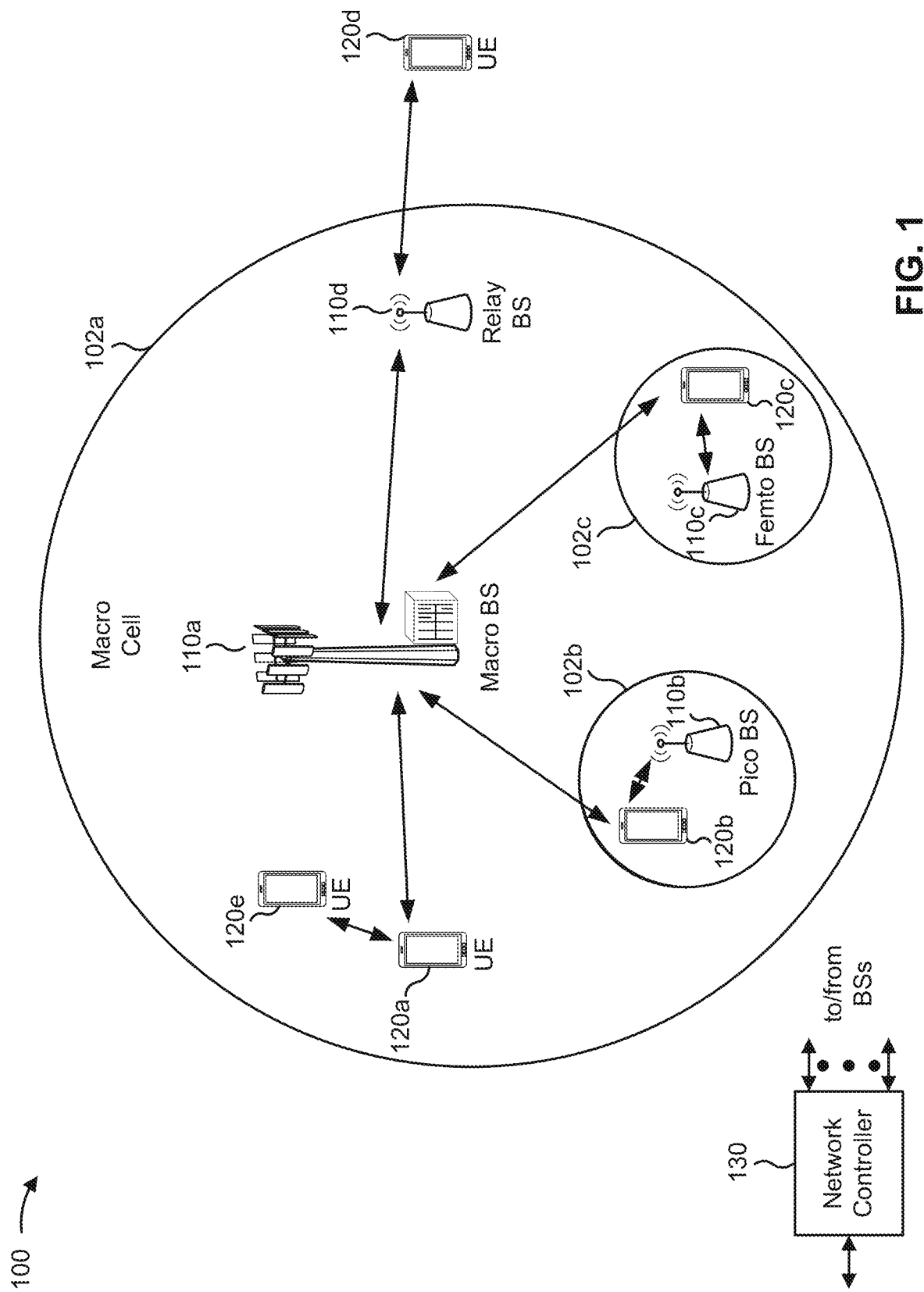
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
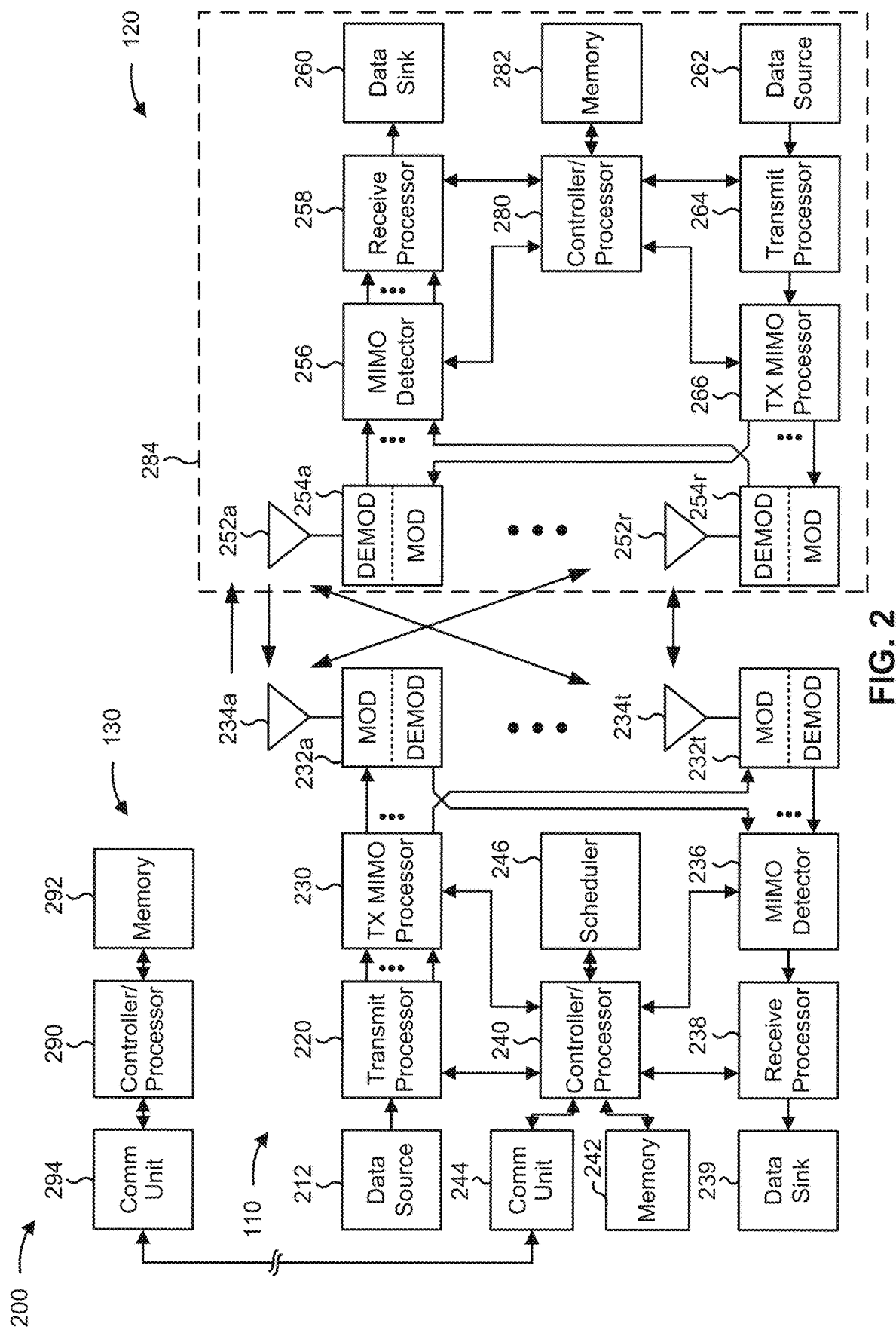
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-12).

Controller/processor 240 of base station 110, controller/processor 280 of UE 120, and/or any other component(s) of FIG. 2 may perform one or more techniques associated with switching gap based rate matching and shared channel mapping, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for receiving scheduling information that schedules a shared channel that is associated with a first beamforming configuration; means for determining that a gap between the shared channel and a resource associated with a second beamforming configuration fails to satisfy a threshold, wherein the UE is configured to monitor the resource associated with the second beamforming configuration; means for modifying at least one of the gap to satisfy the threshold or the second beamforming configuration to match the first beamforming configuration based at least in part on determining that the gap fails to satisfy the threshold; means for switching from the second beamforming configuration to the first beamforming configuration, or from the first beamforming configuration to the second beamforming configuration, in the modified gap; means for receiving the shared channel using a same beam as a control channel associated with the resource, based at least in part on modifying the first beamforming configuration to match the second beamforming configuration; means for rate matching the shared channel around the resource associated with the second beamforming configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting scheduling information that schedules a shared channel that is associated with a first beamforming configuration, wherein a gap between the shared channel and a resource associated with a second beamforming configuration fails to satisfy a threshold; means for modifying at least one of the gap to satisfy the threshold or the first beamforming configuration to match the second beamforming configuration based at least in part on determining that the gap fails to satisfy the threshold; means for transmitting the shared channel in accordance with at least one of the modified gap or the modified first beamforming configuration; means for transmitting the shared channel using a same beam as a control channel associated with the resource, based at least in part on modifying the second beamforming configuration to match the first beamforming configuration; means for rate matching the shared channel around the resource associated with the second beamforming configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, base station 110 may include means for mapping one or more demodulation reference signals (DMRSs) to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; means for mapping data of the shared channel to the one or more segments; means for transmitting the one or more segments of the shared channel; means for dropping a segment, of the two or more segments, based at least in part on the segment including only one symbol in a time domain; means for determining a location of a DMRS, of the one or more DMRSs, in a corresponding segment based at least in part on a quantity of DMRS symbols associated with the DMRS and the respective quantity of symbols of the corresponding segment; means for determining whether mapping of the data is to be performed using the first rule or the second rule; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving or transmitting one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments; means for receiving data of the shared channel on the one or more segments; means for processing the data of the shared channel; means for determining whether the mapping uses the first rule or the second rule; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A downlink transmission, such as a shared channel (e.g., a physical downlink shared channel (PDSCH)), a control channel (e.g., a physical downlink control channel (PDCCH)), and/or the like, may be transmitted by a base station using a transmit beam and received by a UE using a receive beam corresponding to the transmit beam. A beam (e.g., a receive beam to be used by the UE) may be indicated by a transmission configuration indication (TCI) state that corresponds to a quasi-colocation (QCL) parameter. A QCL parameter may identify a QCL relationship between two or more signals or channels. For example, a QCL parameter may identify a source signal (e.g., a synchronization signal block (SSB), a reference signal, and/or the like), and properties of a target signal may be inferred from the corresponding properties of the source signal. Different QCL types may indicate different sets of QCL parameters, different source signals, and/or different target signals. The set of QCL parameters that define an analog beam may be referred to herein as a beamforming configuration.

In some aspects, QCL Type D may be used to specify spatial properties used to transmit a shared channel. For example, downlink control information (DCI) associated with the shared channel may specify a TCI state associated with the shared channel. The TCI state may have a QCL Type D configuration. Therefore, the UE may infer spatial properties of the shared channel from spatial properties of a corresponding signal identified by the TCI state. The determination of the QCL parameters for the shared channel may be based at least in part on a threshold. For example, if a scheduling offset between a PDCCH that carries the DCI and the shared channel fails to satisfy a threshold (referred to herein as a QCL time duration threshold), then the UE may infer a QCL property for demodulation reference signal (DMRS) ports of the shared channel from a QCL property of a control resource set (CORESET) of a lowest identifier monitored in a latest slot (e.g., a default TCI state assumption). This may enable the UE to determine a spatial configuration of the shared channel in the event that a time gap between the PDCCH and the DCI is too short for the UE to implement the TCI state specified by the PDCCH. If the scheduling offset between the PDCCH and the shared channel satisfies the QCL time duration threshold (meaning that the UE has sufficient time to implement the TCI state specified by the PDCCH), then the UE may assume that DMRS ports of the shared channel are quasi-colocated with reference signals identified by the TCI state specified by the PDCCH.

Beam switching involves delay associated with a variety of sources. For example, an analog beam switching procedure to switch to a beam that is indicated using control information may involve the decoding of control information (e.g., the DCI described above), the reprogramming of radio frequency software and firmware, and the retuning of radio frequency frontends (RFFEs), which introduces some beam switching delay. The QCL time duration threshold described above may mitigate this beam switching delay. In comparison, when a beam switch is pre-configured, the UE needs not decode DCI and reprogram software or firmware. Therefore, the beam switching delay is significantly shorter for a pre-configured beam switch than when the target beam is signaled using DCI.

In some frequency ranges (e.g., Frequency Range 2 (FR2)), the beam switching delay can be contained within a cyclic prefix (CP) of an OFDM symbol. Therefore, beam switching in such a frequency range may not significantly impact data performance of the UE. However, in higher frequency ranges (e.g., associated with a roughly 60 GHz carrier frequency, such as Frequency Range 4 (FR4)), a higher subcarrier spacing (SCS) may be used to combat phase noise. A higher SCS is generally associated with a shorter OFDM symbol length and a shorter CP length. Therefore, in such a frequency range, the analog beam switching delay may not be contained within a CP, leading to data interruption. For example, consider a case where a CORESET and a PDSCH are scheduled in a same slot (e.g., adjacent to each other, time-overlapped with each other, and/or the like). In this case, if the PDSCH and the CORESET use different beams, the analog beam switching delay may lead to interruption of the PDSCH. This may be particularly problematic when a gap between the PDSCH and a DCI that schedules the PDSCH satisfies the QCL time duration threshold, meaning that the DCI can indicate a different beam for the PDSCH than the beam associated with the CORESET. Thus, the UE may have to switch between different beams between an end of the CORESET and a start of the PDSCH (when the CORESET is adjacent to the PDSCH in time) or in the midst of the PDSCH (when the CORESET partially overlaps the PDSCH in time).

Techniques and apparatuses described herein provide gap based rate matching and/or beam selection for a CORESET and a shared channel that are adjacent to each other or that overlap in a slot. For example, in some aspects, a UE may assume that a same beam is used for a PDCCH of the CORESET as for the shared channel when certain conditions are satisfied, thus reducing or eliminating a beam switching delay between the CORESET and the shared channel. Additionally, or alternatively, the UE may allocate one or more rate matching symbols within the shared channel to provide a beam switching gap for switching from a beamforming configuration associated with the CORESET to a beamforming configuration associated with the shared channel. In some aspects, the UE may selectively allocate one or more rate matching symbols, and/or determine a beamforming configuration, based at least in part on whether the PDCCH is at least partially overlapped with the shared channel in time. Furthermore, techniques and apparatuses described herein provide for rate matching of the shared channel based at least in part on the PDCCH at least partially overlapping the shared channel in frequency (e.g., without signaling indicating that the shared channel is to be rate matched), thereby conserving computing and communication resources that would otherwise be used for such signaling.

In this way, data interruption at the UE may be reduced. For example, the beam switching gap may be reduced or eliminated. As another example, the UE may rate match around the beam switching gap, thereby providing the data of the shared channel that would otherwise have been interrupted by the beam switching gap. Thus, throughput and reliability are improved, particularly in higher frequency ranges such as FR2 and FR4.

Figure 3:
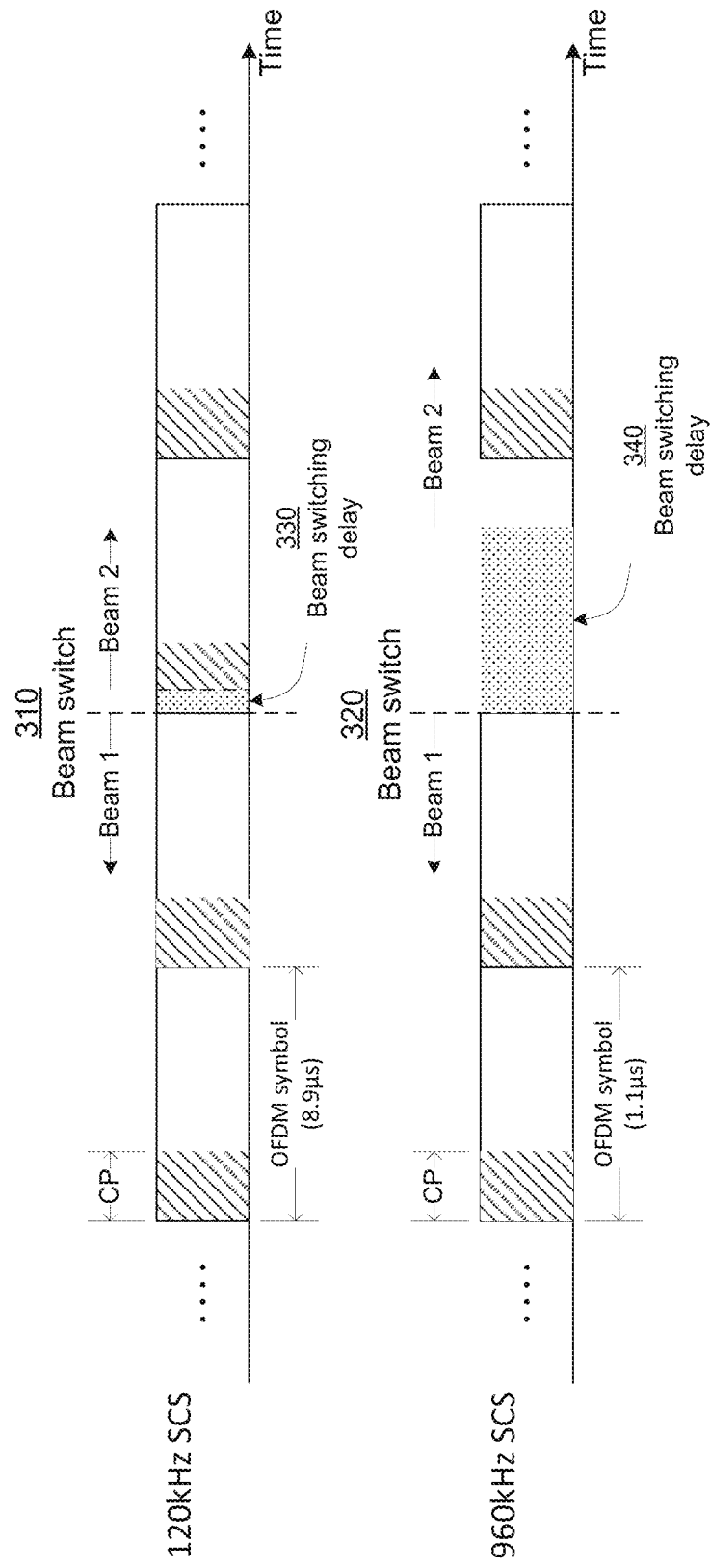
FIG. 3 is a diagram illustrating an example of beam switching delays in different frequency ranges, in accordance with the present disclosure.

FIG. 3 is a diagram illustrating an example 300 of beam switching delays in different frequency ranges, in accordance with the present disclosure. FIG. 3 shows a first example involving a 120 kHz subcarrier spacing (SCS) and a second example involving a 960 kHz SCS. For example, the 120 kHz SCS may be associated with a lower frequency range than the 960 kHz SCS. As shown, the 120 kHz SCS is associated with an OFDM symbol length of 8.9 microseconds, and the 960 kHz SCS is associated with an OFDM symbol length of 1.1 microseconds. OFDM symbols are sometimes referred to as symbols.

Beam switches in the 120 kHz SCS and the 960 kHz SCS are shown by reference numbers 310 and 320, respectively. Corresponding beam switching delays are shown by reference numbers 330 and 340, respectively. These beam switching delays are of the same time length, but the beam switching delay of the 120 kHz SCS occupies less of an OFDM symbol than the beam switching delay of the 960 kHz SCS. For example, the beam switching delay of the 120 kHz SCS may be contained within a cyclic prefix (CP) in the 120 kHz SCS. However, in the 960 kHz SCS, the beam switching delay extends into the data segment of the symbol due to the proportionately shorter CP length. This may be exacerbated in higher SCSs, such as 1.92 MHz, 3.84 MHz, and so on, where the beam switching delay may extend across multiple symbols.

Some techniques and apparatuses described herein provide mitigation of the beam switching delay, for example, by using a same beamforming configuration for the symbol preceding the beam switch and the symbol following the beam switch (thereby eliminating the beam switching delay) and/or by rate matching one or more symbols associated with the beam switching delay (thereby providing data that would have been interrupted by the beam switching delay on other symbols). Furthermore, one or more DMRSs and resources of a shared channel may be mapped around the one or more symbols associated with the beam switching delay according to the implementations described herein.

As indicated above, FIG. 3 is provided as an example. Other examples may differ from what is described with respect to FIG. 3.

Figure 4:
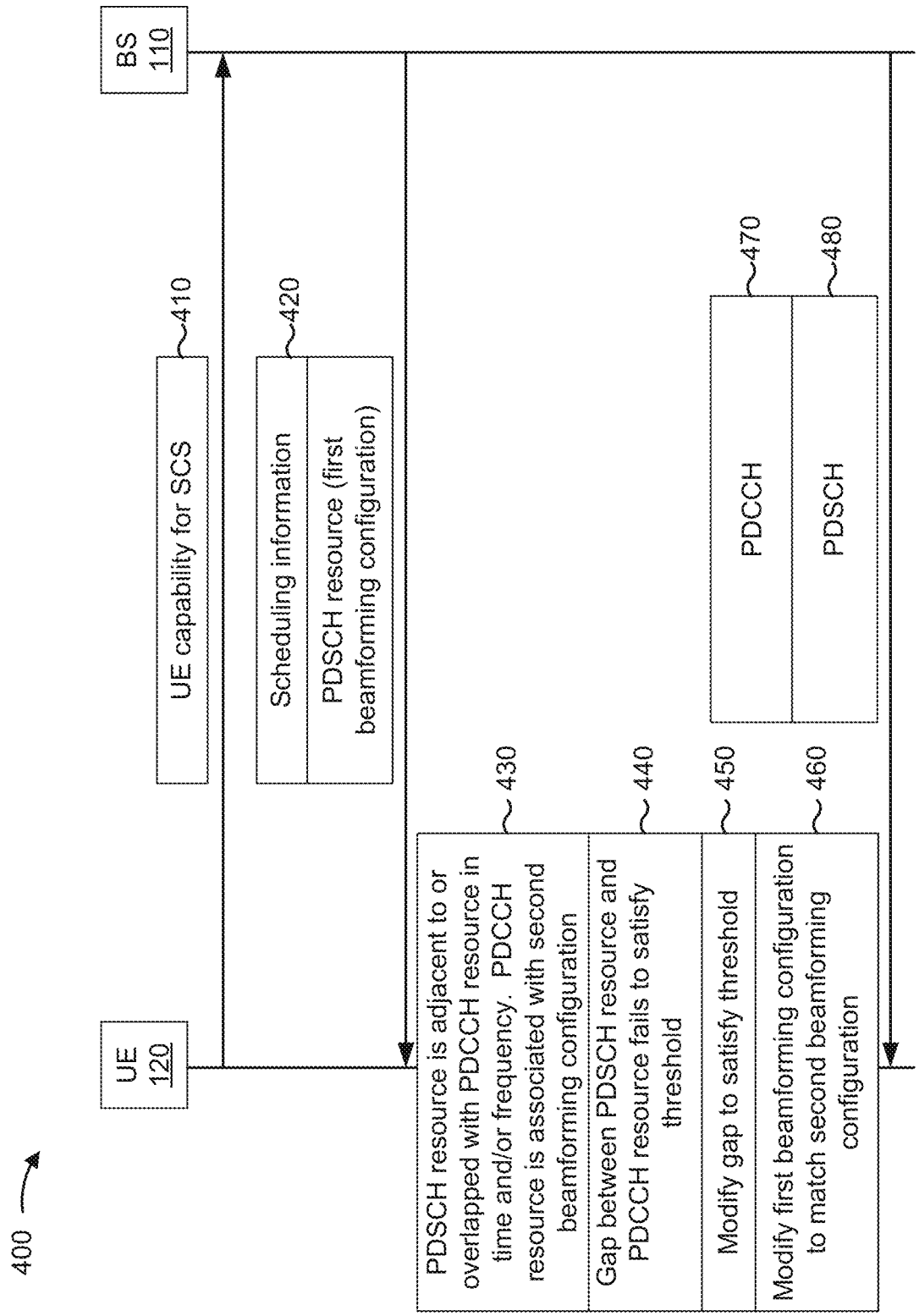
FIG. 4 is a diagram illustrating an example of signaling associated with switching gap based rate matching, in accordance with the present disclosure.

FIG. 4 is a diagram illustrating an example 400 of signaling associated with switching gap based rate matching, in accordance with the present disclosure. As shown, example 400 includes a UE 120 and a BS 110.

As shown by reference number 410, the UE 120 may provide capability information to the BS 110. In some aspects, the capability information may identify a set of SCSs that the UE 120 is capable of using. For example, the capability information may include a UE capability regarding an SCS. In some aspects, the capability information may include information associated with a beam switching capability of the UE 120, such as information indicating a beam switching time of the UE 120 and/or the like.

As shown by reference number 420, the BS 110 may provide scheduling information to the UE 120. The scheduling information may include information indicating a PDSCH resource (e.g., a resource allocation and/or the like). For example, the scheduling information may include downlink control information (DCI), radio resource control (RRC) information, a medium access control (MAC) message, and/or the like. As further shown, the scheduling information may indicate a first beamforming configuration for the PDSCH. For example, the scheduling information may indicate a TCI state for the PDSCH that is associated with a QCL Type D that indicates the first beamforming configuration.

As shown by reference number 430, the PDSCH resource may be adjacent to or at least partially overlapped with a PDCCH resource (e.g., a CORESET, a search space set, and/or the like) in time and/or frequency. For example, the PDCCH resource may precede the PDSCH resource and/or may be in a same slot as the PDSCH resource. In some aspects, the PDCCH resource may be separated from the PDSCH resource in time by a gap that fails to satisfy a threshold, as described below. As further shown, the PDCCH resource may be associated with a second beamforming configuration that is different than the first beamforming configuration. Thus, there may be a beam switching delay between the PDSCH resource and the PDCCH resource, which may impact reception of the PDSCH associated with the PDSCH resource. In some aspects, the PDCCH resource may be associated with a same cell as the PDSCH resource. In some aspects, the PDCCH resource may be associated with a different cell (i.e., carrier) than the PDSCH resource and a same frequency range (e.g., a same frequency band) as the PDSCH resource.

As shown by reference number 440, the UE 120 may determine that a gap between the PDSCH resource and the PDCCH resource fails to satisfy a threshold. For example, the threshold may be based at least in part on the beam switching delay of the UE 120. In some aspects, the gap may be a zero-length gap, for example, when the PDSCH resource is adjacent to the PDCCH resource and when the PDSCH resource overlaps the PDCCH resource. In some aspects, the gap may be a non-zero-length gap that fails to satisfy the threshold.

As shown by reference numbers 450 and 460, the UE 120 may perform one or more actions based at least in part on the gap failing to satisfy the threshold. In some aspects, the UE 120 may perform the one or more actions based at least in part on a condition in addition to the gap failing to satisfy the threshold. For example, the UE 120 may perform the one or more actions based at least in part on a scheduling offset (e.g., KO) between the PDSCH resource and the scheduling information satisfying a QCL time duration threshold (meaning that the first beamforming configuration indicated by the scheduling information is used for the PDSCH resource), based at least in part on the PDSCH resource and the PDCCH resource being included in a same slot, based at least in part on the PDSCH resource and the PDCCH resource being associated with different beamforming configurations, or a combination thereof.

As shown by reference number 450, in some aspects, the UE 120 may modify the gap to satisfy the threshold. For example, the UE 120 may lengthen the gap so that the beam switching delay of the UE 120 is included within the gap. In some aspects, the UE 120 may modify the gap by allocating one or more rate matching resources. For example, the one or more rate matching resources may be OFDM symbol-level rate matching resources. In some aspects, the one or more rate matching resources may be included in the PDSCH resource. For example, the one or more rate matching resources may be provided immediately adjacent to the PDCCH resource. As another example, the one or more rate matching resources may be provided one or more symbols before or after the PDCCH resource. A quantity of the one or more symbols may be based at least in part on the UE 120's capability information, a network configuration or a configuration of the UE 120, a duration of the CORESET associated with the PDCCH resource, a quantity of allocated symbols of the PDSCH resource, and/or the like.

In some aspects, a duration of the one or more rate matching symbols (e.g., the modified gap) may be based at least in part on the UE 120's capability information, a scheduled modulation and coding scheme of the PDSCH resource, a transport block size of the PDSCH resource, a number of allocated PDSCH symbols of the PDSCH resource, and/or the like. In some aspects, the UE 120 may modify the gap to satisfy the threshold based at least in part on the PDCCH resource being adjacent to the PDSCH resource or based at least in part on the PDCCH resource partially overlapping the PDSCH resource.

As shown by reference number 460, in some aspects, the UE 120 may modify the first beamforming configuration (e.g., the beamforming configuration of the PDSCH resource) to match the second beamforming configuration (e.g., the beamforming configuration of the PDCCH resource). In other words, the UE 120 may use a same QCL Type D property for the PDSCH resource and for the PDCCH resource. In some aspects, the UE 120 may use the same beamforming configuration for the PDCCH resource and for a segment of the PDSCH resource. For example, the PDSCH resource may be divided into two or more segments by the one or more rate matching symbols: a first segment that is adjacent to or overlapped with the PDCCH resource, and one or more second segments that occur after the one or more rate matching symbols. In such a case, the UE 120 may use the second beamforming configuration for the first segment, and may switch to the first beamforming configuration in the one or more rate matching resources. Thus, the UE 120 may eliminate the beam switching delay at least with regard to the first segment. In some aspects, the UE 120 may modify the first beamforming configuration based at least in part on the PDCCH resource overlapping with the PDSCH resource in time.

As shown by reference numbers 470 and 480, the UE 120 may receive the PDCCH and the PDSCH. For example, the UE 120 may receive the PDCCH and the PDSCH in accordance with the modified gap and/or the modified first beamforming configuration. In this way, the UE 120 may reduce data interruption of the PDSCH in higher frequency ranges due to the beam switching delay of the UE 120, thereby increasing data throughput and reliability of communications.

As indicated above, FIG. 4 is provided as an example. Other examples may differ from what is described with respect to FIG. 4.

Figure 5:
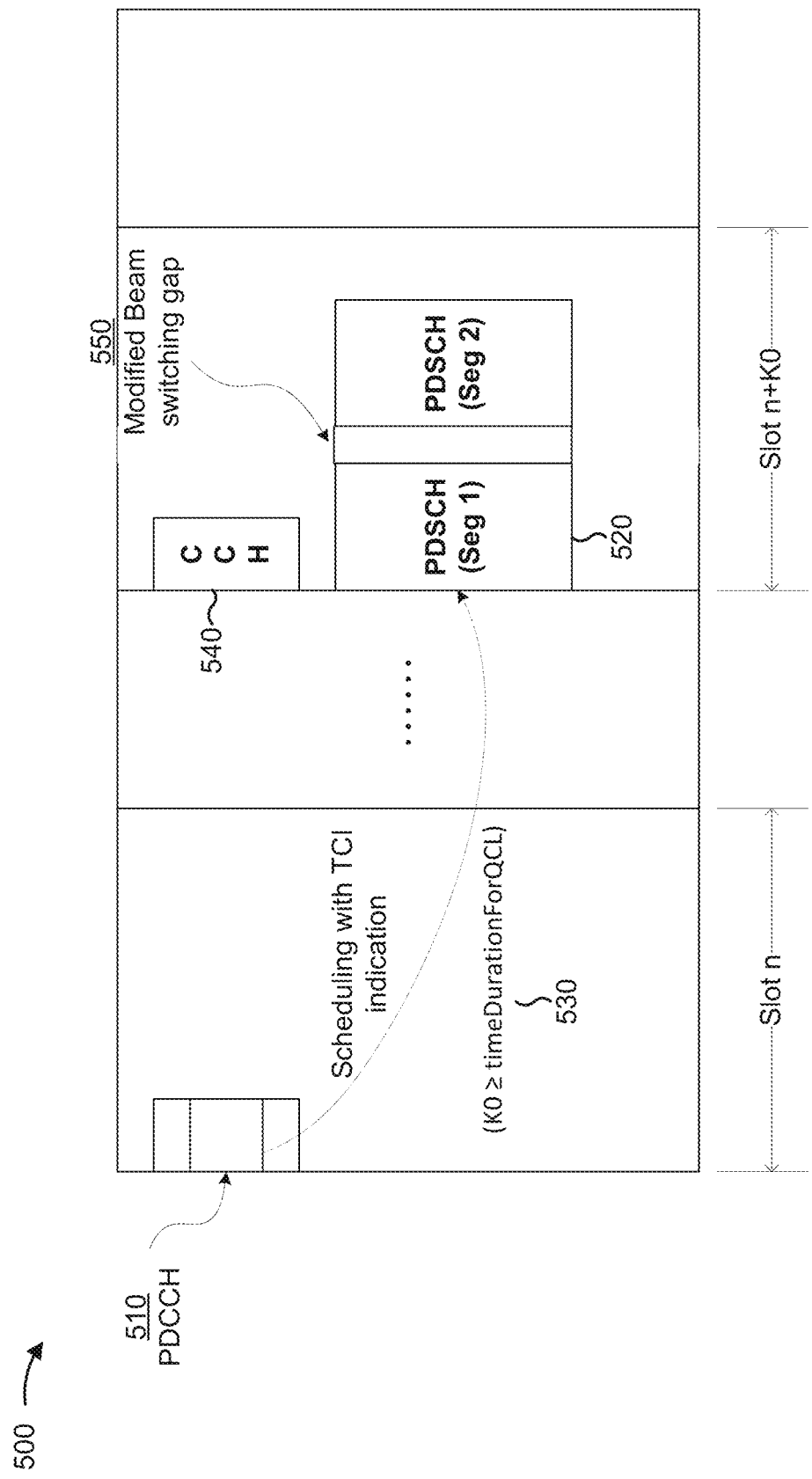
FIG. 5 is a diagram illustrating an example of switching gap based rate matching incorporating a beam switching gap, in accordance with the present disclosure.

FIG. 5 is a diagram illustrating an example 500 of switching gap based rate matching incorporating a beam switching gap, in accordance with the present disclosure. Example 500 shows a PDCCH 510 that is included in a CORESET. As shown, the PDCCH 510 schedules a PDSCH 520. Furthermore, as shown by reference number 530, a scheduling offset (KO) between the PDCCH 510 and the PDSCH 520 satisfies a threshold (e.g., timeDurationForQCL, referred to herein as the QCL time duration threshold). Therefore, a TCI state indication of the PDCCH 510 can be used for the PDSCH 520. However, the PDSCH 520 overlaps a control channel (CCH) 540 in time. If the CCH 540 is associated with a different beamforming configuration (e.g., TCI state) than the PDSCH 520, then the UE 120 may experience data loss on the PDSCH 520 while switching from the CCH 540's beamforming configuration to the PDSCH 520's beamforming configuration. Therefore, the UE 120 modifies a gap, shown by reference number 550, to accommodate the beam switching delay. For example, the UE 120 may rate match the resources shown in the modified beam switching gap so that data of the PDSCH 520 is not interrupted by the beam switching operation of the UE 120. In some aspects, the UE 120 may use a same beamforming configuration for the CCH 540 and for Segment 1 of the PDSCH 520 so that a usable data portion of the PDSCH 520 is increased relative to rate matching Segment 1 and the modified gap.

In some aspects, the CCH 540 may overlap with Segment 2 in addition to or as an alternative to Segment 1. In some aspects, the UE 120 may configure the modified beam switching gap so that the PDSCH 520 is divided into two equal segments, two approximately equal segments, and/or the like.

As indicated above, FIG. 5 is provided as an example. Other examples may differ from what is described with respect to FIG. 5.

Figure 6:
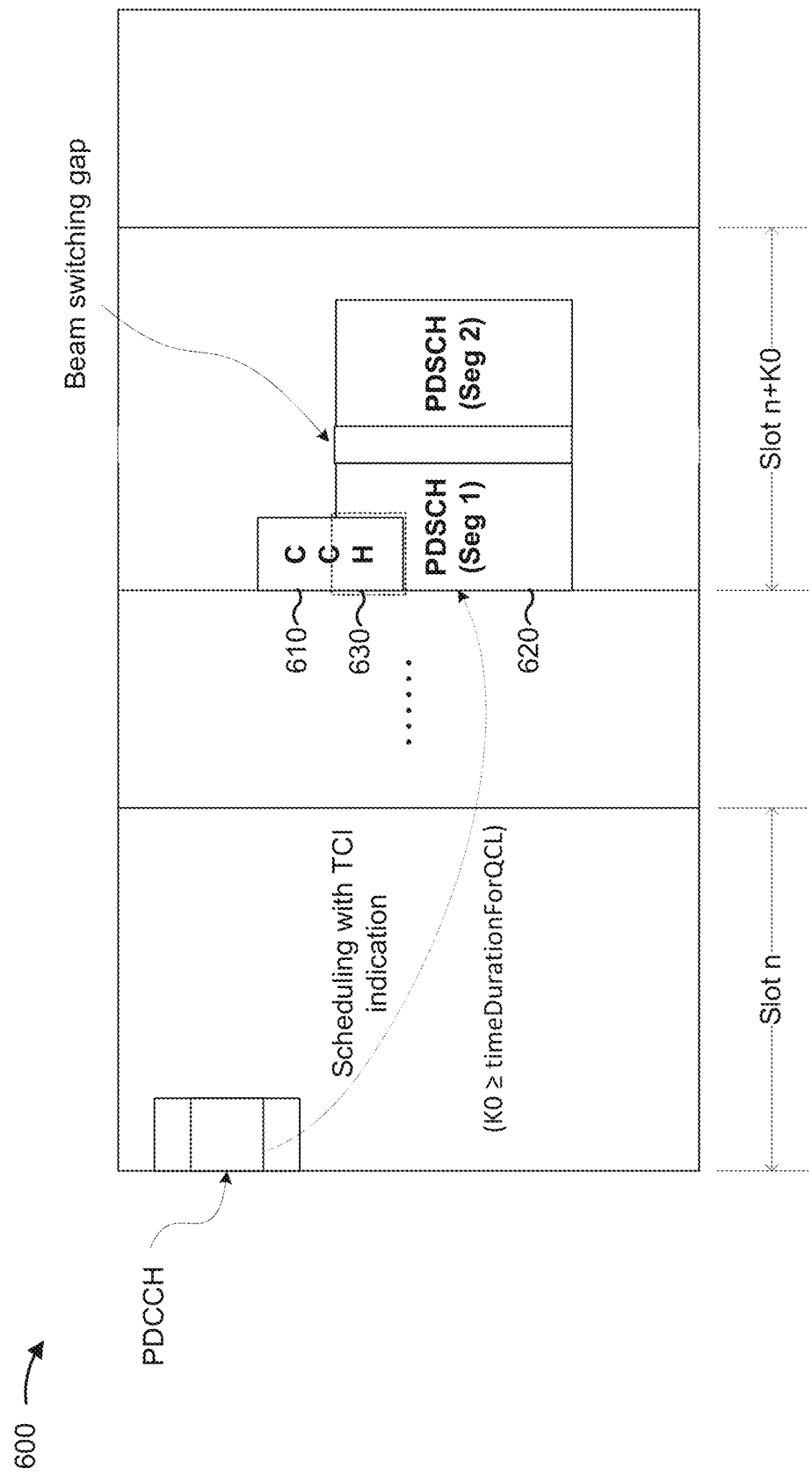
FIG. 6 is a diagram illustrating an example of switching gap based rate matching involving an overlapped control channel and shared channel, in accordance with the present disclosure.

FIG. 6 is a diagram illustrating an example 600 of switching gap based rate matching involving an overlapped control channel and shared channel, in accordance with the present disclosure. In example 600, the CCH 610 overlaps the PDSCH 620 in frequency. In such a case, the UE 120 may rate match the PDSCH 620 around an overlapped region 630. For example, the resource blocks in the overlapped region 630 may not be available for the PDSCH 620. In some aspects, the UE 120 may perform the rate matching without receiving signaling indicating to perform the rate matching. For example, the UE 120 may perform the rate matching with receiving a rate match pattern indicating to rate match around the overlapped region 630. Thus, the UE 120 may rate match around a CCH 610 that does not perform same-slot scheduling of the corresponding PDSCH 620.

As indicated above, FIG. 6 is provided as an example. Other examples may differ from what is described with respect to FIG. 6.

Figure 7:
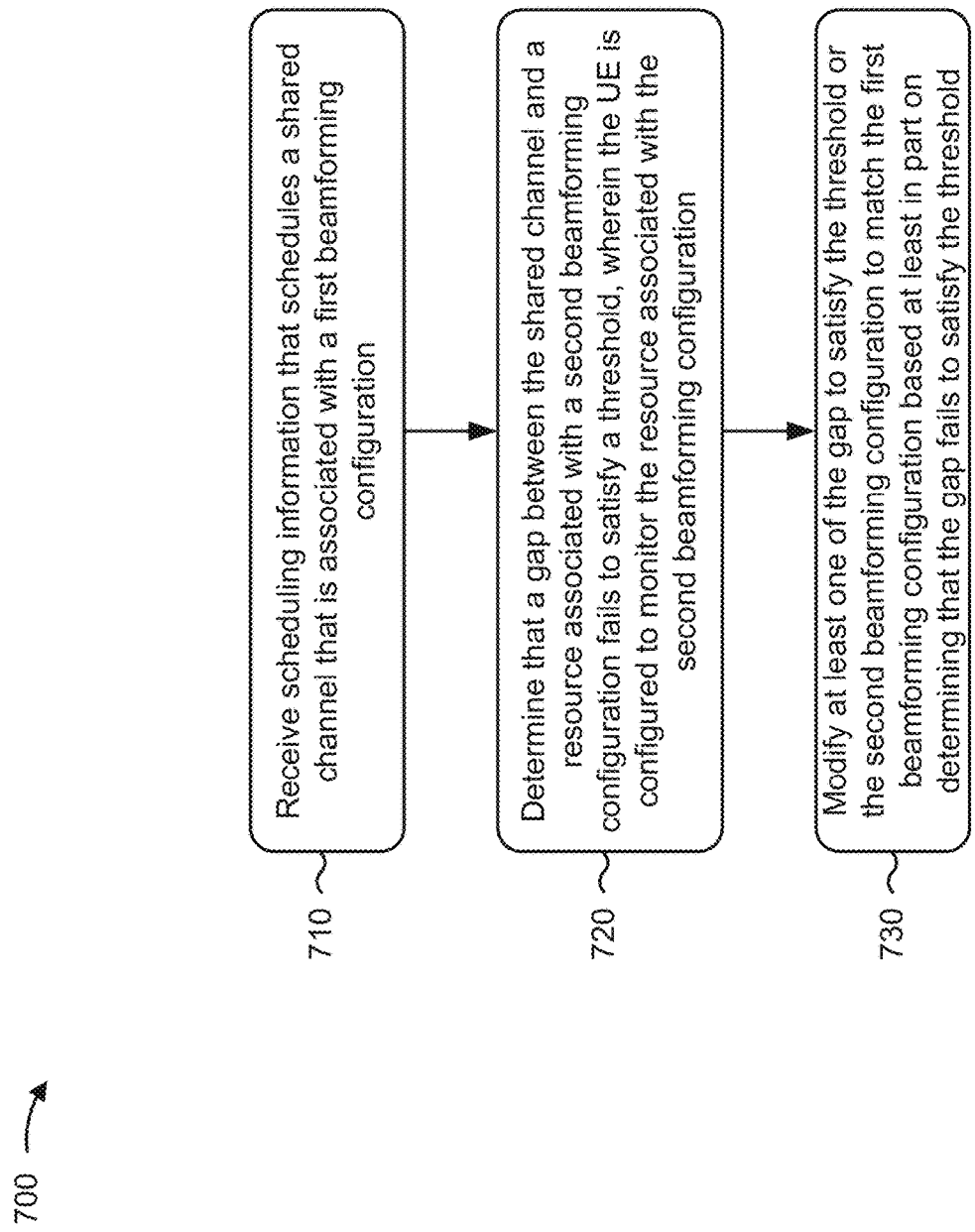
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with switching gap based rate matching.

As shown in FIG. 7, in some aspects, process 700 may include receiving scheduling information that schedules a shared channel that is associated with a first beamforming configuration (block 710). For example, the UE (e.g., using antenna 252, DEMOD 254, MIMO detector 256, receive processor 258, controller/processor 280, and/or the like) may receive scheduling information that schedules a shared channel that is associated with a first beamforming configuration, as described above.

As further shown in FIG. 7, in some aspects, process 700 may include determining that a gap between the shared channel and a resource associated with a second beamforming configuration fails to satisfy a threshold, wherein the UE is configured to monitor the resource associated with the second beamforming configuration (block 720). For example, the UE (e.g., using antenna 252, DEMOD 254, MIMO detector 256, receive processor 258, controller/processor 280, and/or the like) may determine that a gap between the shared channel and a resource associated with a second beamforming configuration fails to satisfy a threshold, as described above. In some aspects, the UE is configured to monitor the resource associated with the second beamforming configuration.

As further shown in FIG. 7, in some aspects, process 700 may include modifying at least one of the gap to satisfy the threshold or the second beamforming configuration to match the first beamforming configuration based at least in part on determining that the gap fails to satisfy the threshold (block 730). For example, the UE (e.g., using antenna 252, DEMOD 254, MIMO detector 256, receive processor 258, controller/processor 280, and/or the like) may modify at least one of the gap to satisfy the threshold or the second beamforming configuration to match the first beamforming configuration based at least in part on determining that the gap fails to satisfy the threshold, as described above.

Process 700 may include additional aspects, such as any single aspect or any combination of aspects described below and/or in connection with one or more other processes described elsewhere herein.

In a first aspect, the gap is modified, and the method further comprises: switching from the second beamforming configuration to the first beamforming configuration, or from the first beamforming configuration to the second beamforming configuration, in the modified gap.

In a second aspect, alone or in combination with the first aspect, the gap is a zero-length gap based at least in part on the resource associated with the second beamforming configuration being adjacent to or overlapping, in time, a resource associated with the shared channel.

In a third aspect, alone or in combination with one or more of the first and second aspects, a resource associated with the shared channel overlaps the resource associated with the second beamforming configuration in at least one of time or frequency.

In a fourth aspect, alone or in combination with one or more of the first through third aspects, modifying the gap to satisfy the threshold comprises allocating one or more rate matching resources, the shared channel is rate matched around the one or more rate matching resources.

In a fifth aspect, alone or in combination with one or more of the first through fourth aspects, a time duration of the one or more rate matching resources is based at least in part on a UE capability regarding a subcarrier spacing.

In a sixth aspect, alone or in combination with one or more of the first through fifth aspects, a time duration of the one or more rate matching resources is based at least in part on at least one of: a modulation and coding scheme of the shared channel or the resource, a transport block size of the shared channel or the resource, or a quantity of symbols of the shared channel.

In a seventh aspect, alone or in combination with one or more of the first through sixth aspects, the one or more rate matching resources are allocated starting immediately adjacent to the resource associated with the second beamforming configuration.

In an eighth aspect, alone or in combination with one or more of the first through seventh aspects, the one or more rate matching resources are allocated starting one or more symbols before or after the resource associated with the second beamforming configuration.

In a ninth aspect, alone or in combination with one or more of the first through eighth aspects, a quantity of the one or more symbols is based at least in part on at least one of: a capability of the UE, a configuration of the UE, a duration of a control resource set associated with the resource associated with the second beamforming configuration, or a quantity of symbols of the shared channel.

In a tenth aspect, alone or in combination with one or more of the first through ninth aspects, the shared channel is divided into a first segment and a second segment by the one or more rate matching resources, and the second beamforming configuration is used for the first segment.

In an eleventh aspect, alone or in combination with one or more of the first through tenth aspects, process 700 includes receiving the shared channel using a same beam as a control channel associated with the resource, based at least in part on modifying the first beamforming configuration to match the second beamforming configuration.

In a twelfth aspect, alone or in combination with one or more of the first through eleventh aspects, the resource associated with the second beamforming configuration is associated with a same cell as the shared channel.

In a thirteenth aspect, alone or in combination with one or more of the first through twelfth aspects, the resource associated with the second beamforming configuration is associated with a different cell than the shared channel and associated with a same frequency band as the shared channel.

In a fourteenth aspect, alone or in combination with one or more of the first through thirteenth aspects, determining that the gap fails to satisfy the threshold is based at least in part on a scheduling offset, between the shared channel and a control channel that schedules the shared channel, satisfying a quasi-colocation switching time threshold.

In a fifteenth aspect, alone or in combination with one or more of the first through fourteenth aspects, the resource associated with the second beamforming configuration overlaps the shared channel in frequency, and the method further comprises: rate matching the shared channel around the resource associated with the second beamforming configuration.

In a sixteenth aspect, alone or in combination with one or more of the first through fifteenth aspects, the shared channel is rate matched around the resource associated with the second beamforming configuration without the UE receiving signaling indicating that the shared channel is to be rate matched around the resource.

In a seventeenth aspect, alone or in combination with one or more of the first through sixteenth aspects, the resource associated with the second beamforming configuration is for a control channel other than a control channel that scheduled the shared channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
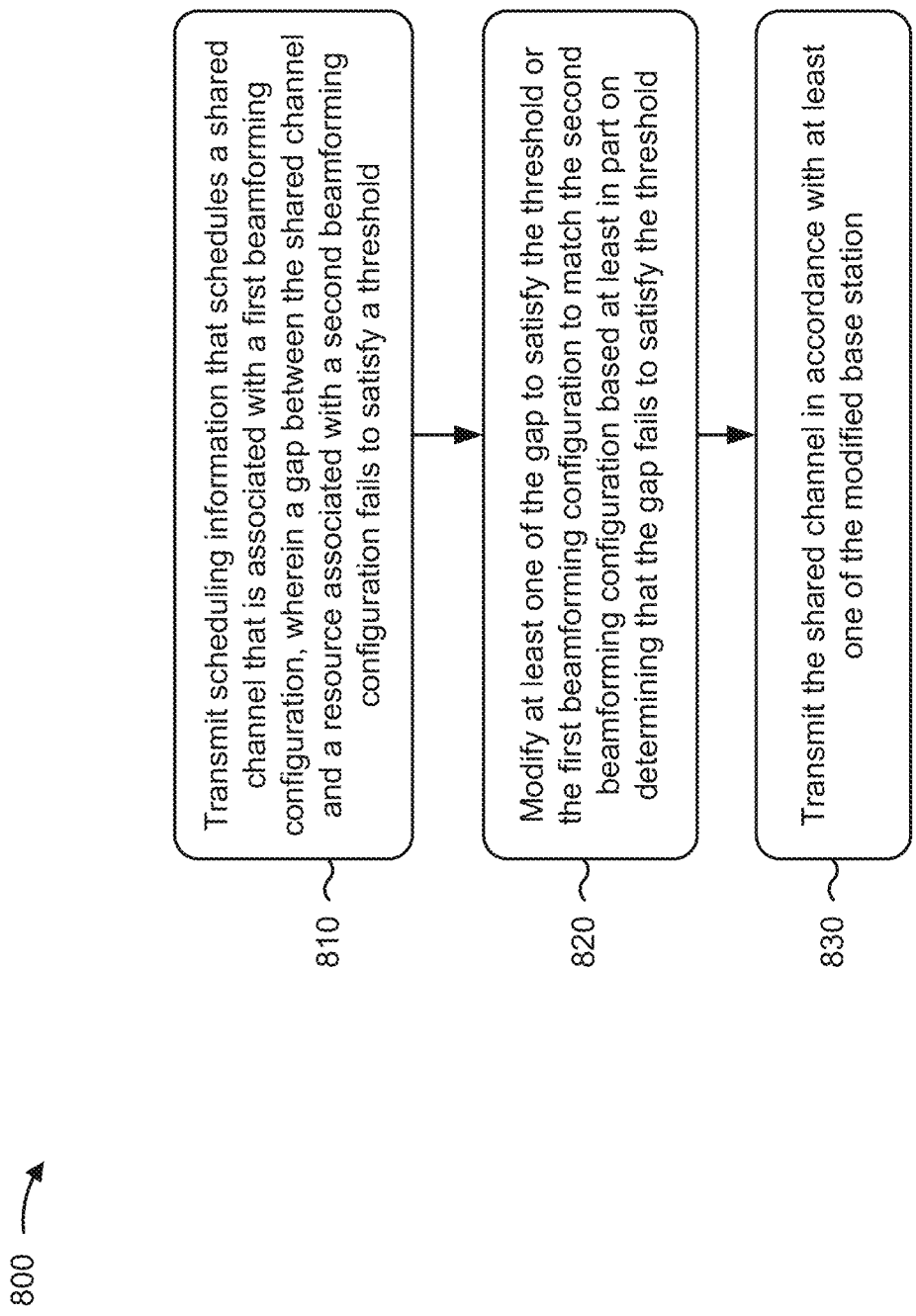
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 and/or the like) performs operations associated with switching gap based rate matching.

As shown in FIG. 8, in some aspects, process 800 may include transmitting scheduling information that schedules a shared channel that is associated with a first beamforming configuration, wherein a gap between the shared channel and a resource associated with a second beamforming configuration fails to satisfy a threshold (block 810). For example, the base station (e.g., using controller/processor 240, transmit processor 220, TX MIMO processor 230, MOD 232, antenna 234, and/or the like) may transmit scheduling information that schedules a shared channel that is associated with a first beamforming configuration, as described above. In some aspects, a gap between the shared channel and a resource associated with a second beamforming configuration fails to satisfy a threshold.

As further shown in FIG. 8, in some aspects, process 800 may include modifying at least one of the gap to satisfy the threshold or the first beamforming configuration to match the second beamforming configuration based at least in part on determining that the gap fails to satisfy the threshold (block 820). For example, the base station (e.g., using controller/processor 240, transmit processor 220, TX MIMO processor 230, MOD 232, antenna 234, and/or the like) may modify at least one of the gap to satisfy the threshold or the first beamforming configuration to match the second beamforming configuration based at least in part on determining that the gap fails to satisfy the threshold, as described above.

As further shown in FIG. 8, in some aspects, process 800 may include transmitting the shared channel in accordance with at least one of the modified gap or the modified first beamforming configuration (block 830). For example, the base station (e.g., using controller/processor 240, transmit processor 220, TX MIMO processor 230, MOD 232, antenna 234, and/or the like) may transmit the shared channel in accordance with at least one of the modified gap or the modified first beamforming configuration, as described above.

Process 800 may include additional aspects, such as any single aspect or any combination of aspects described below and/or in connection with one or more other processes described elsewhere herein.

In a first aspect, the gap is a zero-length gap based at least in part on the resource associated with the second beamforming configuration being adjacent to or overlapping, in time, a resource associated with the shared channel.

In a second aspect, alone or in combination with the first aspect, a resource associated with the shared channel overlaps the resource associated with the second beamforming configuration in at least one of time or frequency.

In a third aspect, alone or in combination with one or more of the first and second aspects, modifying the gap to satisfy the threshold comprises allocating one or more rate matching resources, the shared channel is rate matched around the one or more rate matching resources.

In a fourth aspect, alone or in combination with one or more of the first through third aspects, a time duration of the one or more rate matching resources is based at least in part on a user equipment capability regarding a subcarrier spacing.

In a fifth aspect, alone or in combination with one or more of the first through fourth aspects, a time duration of the one or more rate matching resources is based at least in part on at least one of: a modulation and coding scheme of the shared channel or the resource, a transport block size of the shared channel or the resource, or a quantity of symbols of the shared channel.

In a sixth aspect, alone or in combination with one or more of the first through fifth aspects, the one or more rate matching resources are allocated starting immediately adjacent to the resource associated with the second beamforming configuration.

In a seventh aspect, alone or in combination with one or more of the first through sixth aspects, the one or more rate matching resources are allocated starting one or more symbols before or after the resource associated with the second beamforming configuration.

In an eighth aspect, alone or in combination with one or more of the first through seventh aspects, a quantity of the one or more symbols is based at least in part on at least one of: a user equipment capability, a configuration of a user equipment associated with the shared channel, a duration of a control resource set associated with the resource associated with the second beamforming configuration, or a quantity of symbols of the shared channel.

In a ninth aspect, alone or in combination with one or more of the first through eighth aspects, the shared channel is divided into a first segment and a second segment by the one or more rate matching resources, and the second beamforming configuration is used for the first segment.

In a tenth aspect, alone or in combination with one or more of the first through ninth aspects, process 800 includes transmitting the shared channel using a same beam as a control channel associated with the resource, based at least in part on modifying the second beamforming configuration to match the first beamforming configuration.

In an eleventh aspect, alone or in combination with one or more of the first through tenth aspects, the resource associated with the second beamforming configuration is associated with a same cell as the shared channel.

In a twelfth aspect, alone or in combination with one or more of the first through eleventh aspects, the resource associated with the second beamforming configuration is associated with a different cell than the shared channel and associated with a same frequency band as the shared channel.

In a thirteenth aspect, alone or in combination with one or more of the first through twelfth aspects, determining that the gap fails to satisfy the threshold is based at least in part on a scheduling offset, between the shared channel and a control channel that schedules the shared channel, satisfying a quasi-colocation switching time threshold.

In a fourteenth aspect, alone or in combination with one or more of the first through thirteenth aspects, the resource associated with the second beamforming configuration overlaps the shared channel in frequency, and the method further comprises: rate matching the shared channel around the resource associated with the second beamforming configuration.

In a fifteenth aspect, alone or in combination with one or more of the first through fourteenth aspects, the resource associated with the second beamforming configuration is for a control channel other than a control channel that scheduled the shared channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

A downlink transmission, such as a shared channel (e.g., a physical downlink shared channel (PDSCH)), a control channel (e.g., a physical downlink control channel (PDCCH)), and/or the like, may be transmitted by a base station using a transmit beam and received by a UE using a receive beam corresponding to the transmit beam. A beam (e.g., a receive beam to be used by the UE) may be indicated by a transmission configuration indication (TCI) state that corresponds to a quasi-colocation (QCL) parameter. A QCL parameter may identify a QCL relationship between two or more signals or channels. For example, a QCL parameter may identify a source signal (e.g., a synchronization signal block (SSB), a reference signal, and/or the like), and properties of a target signal may be inferred from the corresponding properties of the source signal. Different QCL types may indicate different sets of QCL parameters, different source signals, and/or different target signals. The set of QCL parameters that define an analog beam may be referred to herein as a beamforming configuration.

In some aspects, QCL Type D may be used to specify spatial properties used to transmit a shared channel. For example, downlink control information (DCI) associated with the shared channel may specify a TCI state associated with the shared channel. The TCI state may have a QCL Type D configuration. Therefore, the UE may infer spatial properties of the shared channel from spatial properties of a corresponding signal identified by the TCI state. The determination of the QCL parameters for the shared channel may be based at least in part on a threshold. For example, if a scheduling offset between a PDCCH that carries the DCI and the shared channel fails to satisfy a threshold (referred to herein as a QCL time duration threshold), then the UE may infer a QCL property for DMRS ports of the shared channel from a QCL property of a control resource set (CORESET) of a lowest identifier monitored in a latest slot (e.g., a default TCI state assumption). This may enable the UE to determine a spatial configuration of the shared channel in the event that a time gap between the PDCCH and the DCI is too short for the UE to implement the TCI state specified by the PDCCH. If the scheduling offset between the PDCCH and the shared channel satisfies the QCL time duration threshold (meaning that the UE has sufficient time to implement the TCI state specified by the PDCCH), then the UE may assume that DMRS ports of the shared channel are quasi-colocated with reference signals identified by the TCI state specified by the PDCCH.

Beam switching involves delay associated with a variety of sources. For example, an analog beam switching procedure to switch to a beam that is indicated using control information may involve the decoding of control information (e.g., the DCI described above), the reprogramming of radio frequency software and firmware, and the retuning of radio frequency frontends (RFFEs), which introduces some beam switching delay. The QCL time duration threshold described above may mitigate this beam switching delay. In comparison, when a beam switch is pre-configured, the UE needs not decode DCI and reprogram software or firmware. Therefore, the beam switching delay is significantly shorter for a pre-configured beam switch than when the target beam is signaled using DCI.

In some frequency ranges (e.g., Frequency Range 2 (FR2)), the beam switching delay can be contained within a cyclic prefix (CP) of an OFDM symbol. Therefore, beam switching in such a frequency range may not significantly impact data performance of the UE. However, in higher frequency ranges (e.g., associated with a roughly 60 GHz carrier frequency, such as Frequency Range 4 (FR4), a higher subcarrier spacing (SCS) may be used to combat phase noise. A higher SCS is generally associated with a shorter OFDM symbol length and a shorter CP length. Therefore, in such a frequency range, the analog beam switching delay may not be contained within a CP, leading to data interruption. For example, consider a case where a CORESET and a PDSCH are scheduled in a same slot (e.g., adjacent to each other, time-overlapped with each other, and/or the like). In this case, if the PDSCH and the CORESET use different beams, the analog beam switching delay may lead to interruption of the PDSCH. This may be particularly problematic when a gap between the PDSCH and a DCI that schedules the PDSCH satisfies the QCL time duration threshold, meaning that the DCI can indicate a different beam for the PDSCH than the beam associated with the CORESET. Thus, the UE may have to switch between different beams between an end of the CORESET and a start of the PDSCH (when the CORESET is adjacent to the PDSCH in time) or in the midst of the PDSCH (when the CORESET partially overlaps the PDSCH in time).

A UE may perform gap based rate matching and/or beam selection for a CORESET and a shared channel that are adjacent to each other or that overlap in a slot. For example, in some aspects, a UE may assume that a same beam is used for a PDCCH of the CORESET as for the shared channel when certain conditions are satisfied, thus reducing or eliminating a beam switching delay between the CORESET and the shared channel. Additionally, or alternatively, the UE may allocate one or more rate matching symbols within the shared channel to provide a beam switching gap for switching from a beamforming configuration associated with the CORESET to a beamforming configuration associated with the shared channel. In some aspects, the UE may selectively allocate one or more rate matching symbols, and/or determine a beamforming configuration, based at least in part on whether the PDCCH is at least partially overlapped with the shared channel in time. Furthermore, the UE may rate match the shared channel based at least in part on the PDCCH at least partially overlapping the shared channel in frequency (e.g., without signaling indicating that the shared channel is to be rate matched), thereby conserving computing and communication resources that would otherwise be used for such signaling.

The position of the rate matching resource may vary from PDSCH to PDSCH. For example, the rate matching resource may be located within the PDSCH at various positions. Such a rate matching resource may not be permitted to overlap with a DMRS within the symbol. This may create difficulty in resource mapping within the PDSCH, since each segment may be associated with a respective DMRS. An inability to successfully map the DMRSs and/or the resources of the PDSCH may lead to a dropped PDSCH and/or inefficient resource utilization.

Some techniques and apparatuses described herein provide mapping of a DMRS and resources of a downlink shared channel (DL-SCH) within a PDSCH that includes a gap based at least in part on a rate matching resource. For example, the gap may be associated with a beam switching delay of the UE. In some aspects, the DMRS mapping may be performed on a per-segment basis, as described elsewhere herein. In some aspects, the PDSCH mapping may be performed by splitting a single redundancy version of the downlink shared channel into code blocks (CBs) and mapping the code blocks to respective segments, referred to herein as a first rule. In some aspects, the PDSCH mapping may be performed by mapping different RVs to respective segments, referred to herein as a second rule. In some aspects, the UE may determine whether to use the first rule or the second rule, as described elsewhere herein. Thus, a DMRS and resources of a downlink shared channel may be mapped to a PDSCH associated with a gap for a beam switching delay, thereby improving reliability of the PDSCH and throughput of the network.

It should be noted that the techniques described herein can be applied for various forms of uplink and downlink communications. The techniques and apparatuses described herein are not limited to those involving DMRS and resource mapping for gaps between a shared channel and a control channel.

Figure 9:
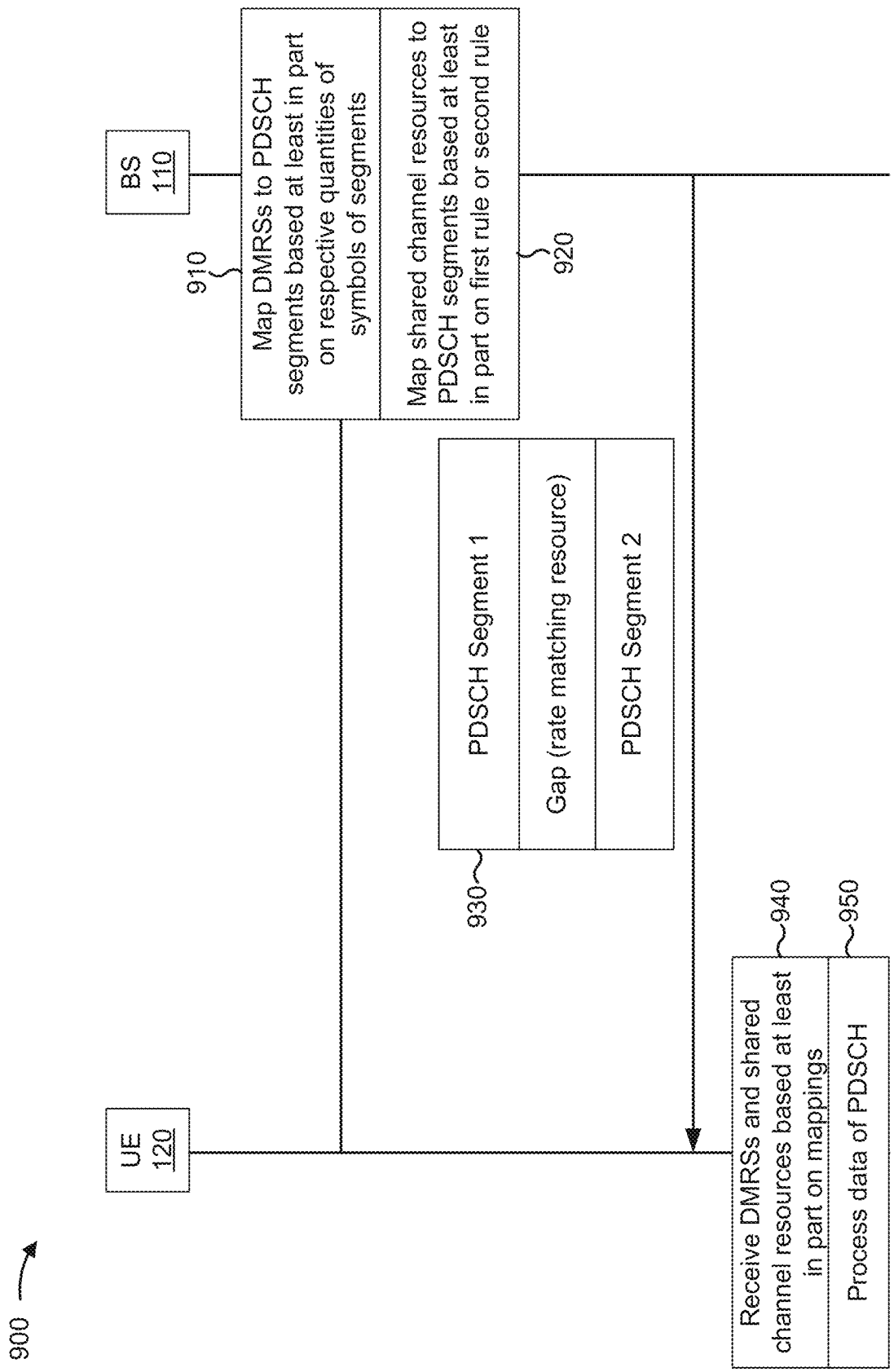
FIG. 9 is a diagram illustrating an example of signaling associated with switching gap based rate matching, in accordance with the present disclosure.

FIG. 9 is a diagram illustrating an example 900 of transmitting a shared channel based at least in part on a mapping scheme for one or more DMRSs and a set of resources of the shared channel, in accordance with the present disclosure. As shown, example 900 includes a UE 120 and a BS 110. Example 900 involves the transmission of a PDSCH that includes a first segment and a second segment. The first segment and the second segment are separated by one or more rate matching resources (e.g., one or more OFDM symbols that are allocated as rate matching resources) to permit the UE 120 to switch from a first beamforming configuration, associated with the first segment, to a second beamforming configuration associated with the second segment.

As shown by reference number 910, the BS 110 may map one or more DMRSs to the first segment and the second segment based at least in part on respective quantities of symbols of the segments. For example, the BS 110 may determine symbol positions of respective DMRSs in each segment of the PDSCH (where the PDSCH can include one or more segments). In some aspects, DMRS mapping may be performed on a per-segment basis. In some aspects, the BS 10 may use a particular DMRS mapping type for the first segment and/or the second segment. As a first example, the BS 110 may use DMRS Type A mapping for the first segment and DMRS Type B mapping for segments after the first segment. As a second example, the BS 110 may use DMRS Type B mapping for all segments associated with the PDSCH. In some aspects, the BS 110 may use the mapping types described above irrespective of an original configured mapping type of the PDSCH. The BS 110 may determine positions of the DMRSs based at least in part on a number of DMRS symbols to be mapped and a number of PDSCH symbols in a given segment. In some aspects, if the size of a segment is smaller than 2 symbols (e.g., if the segment only includes one symbol, which is the minimum size of a PDSCH mapping type B0), then the BS 110 may drop the segment. In DMRS Type A mapping, the DMRS location may be fixed to the third or fourth symbol of the PDSCH or segment. In DMRS Type B mapping, the DMRS location may be fixed to the first symbol of the PDSCH or segment. DMRS Type A mapping may be referred to as a slot based DMRS mapping type, and DMRS Type B mapping may be referred to as a mini-slot based DMRS mapping type.

As shown by reference number 920, the BS 110 may map shared channel resources of the PDSCH for transmission. For example, the BS 110 may map one or more transport blocks (TBs) to the segments of the PDSCH. In some aspects, the BS 110 may split an RV of a transport block into two or more sets of CBs, and each CB, of the two or more sets of CBs, may be mapped to a respective segment. This is referred to herein as a first rule for mapping the resources of the PDSCH. In such a case, if CB group (CBG) based hybrid automatic repeat request (HARQ) feedback is enabled, it may not be expected that a CBG is distributed over two or more segments. In some aspects, different RVs of a single TB may be mapped to respective segments. This is referred to herein as a second rule for mapping resources of the PDSCH.

In some aspects, the BS 110 may determine whether the first rule or the second rule is to be used. For example, the BS 110 may determine whether the first rule or the second rule is to be used based at least in part on a TB size of the PDSCH, a modulation and coding scheme (MCS) of the PDSCH, a number of segments of the PDSCH, and/or the like. In such a case the BS 110 may signal information indicating the selected rule to the UE 120 (e.g., using scheduling downlink control information (DCI) of the PDSCH, radio resource control (RRC) configuration signaling, a medium access control (MAC) control element (CE), and/or the like). Additionally, or alternatively, the UE 120 may determine which rule is to be used based at least in part on one or more of the factors described above as being used by the BS 110 to determine which rule is to be used.

As shown by reference number 930, the BS 110 may transmit the PDSCH, including segments 1 and 2 and the gap, to the UE 120. For example, the PDSCH may include the one or more DMRSs mapped to segments 1 and 2 as described in connection with reference number 910, and shared channel resources mapped to segments 1 and 2 as described in connection with reference number 920. As shown by reference number 940, the UE 120 may receive the one or more DMRSs and the shared channel resources based at least in part on the mappings. For example, the UE 120 may identify positions of the one or more DMRSs and/or the shared channel resources based at least in part on the mapping techniques described in connection with reference numbers 910 and 920. As shown by reference number 950, the UE 120 may process (e.g., demodulate, decode, and/or the like) data of the PDSCH. For example, the UE 120 may process the data based at least in part on the mappings described above.

Thus, the BS 110 and the UE 120 may map a set of DMRSs and shared channel resources to a PDSCH associated with two or more segments, and may transmit and receive the PDSCH accordingly. This enables the usage of the one or more rate matching resources to mitigate beam switching delay and improves efficiency of network communications, thereby conserving computing resources of the UE 120 and the BS 110.

As indicated above, FIG. 9 is provided as an example. Other examples may differ from what is described with respect to FIG. 9.

Figure 10:
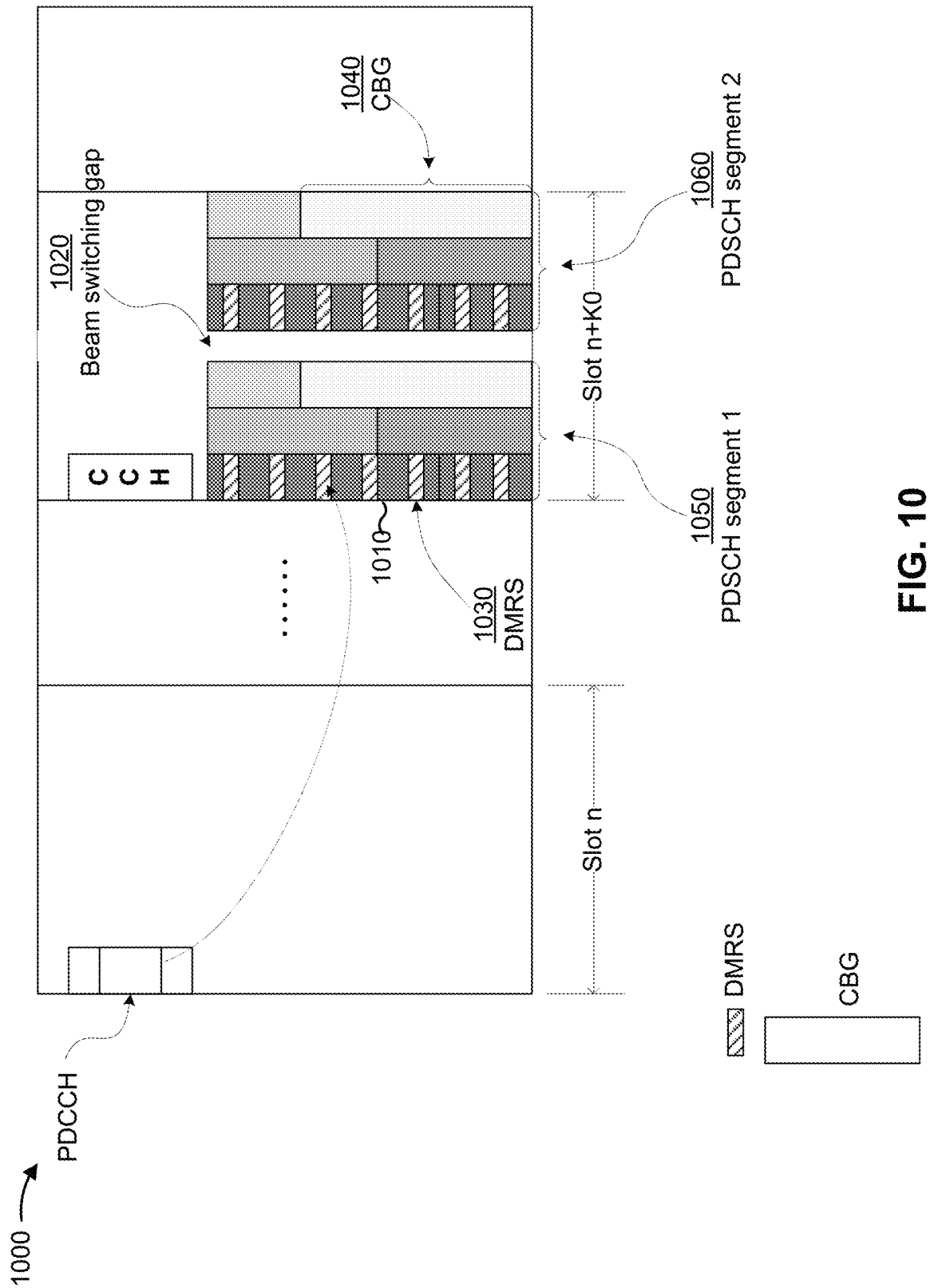
FIG. 10 is a diagram illustrating an example of a resource and demodulation reference signal (DMRS) mapping for a physical downlink shared channel (PDSCH) incorporating a beam switching gap, in accordance with the present disclosure.

FIG. 10 is a diagram illustrating an example 1000 of a resource and DMRS mapping for a physical downlink shared channel (PDSCH) incorporating a beam switching gap, in accordance with the present disclosure. The PDSCH is shown by reference number 1010, and the beam switching gap is shown by reference number 1020. DMRSs, such as the one indicated by reference number 1030, are shown by a diagonal fill. CBGs, such as the one shown by reference number 1040, are shown by various shades of gray fill. As shown, each segment 1050 and 1060 includes a respective set of DMRSs. Here, the DMRSs are mapped to first symbols of each segment (e.g., DMRS Type B mapping) and respective RVs of a CBG are mapped to each segment (as indicated by the same shade of gray being used for corresponding CBGs on each segment).

As indicated above, FIG. 10 is provided as an example. Other examples may differ from what is described with respect to FIG. 10.

Figure 11:
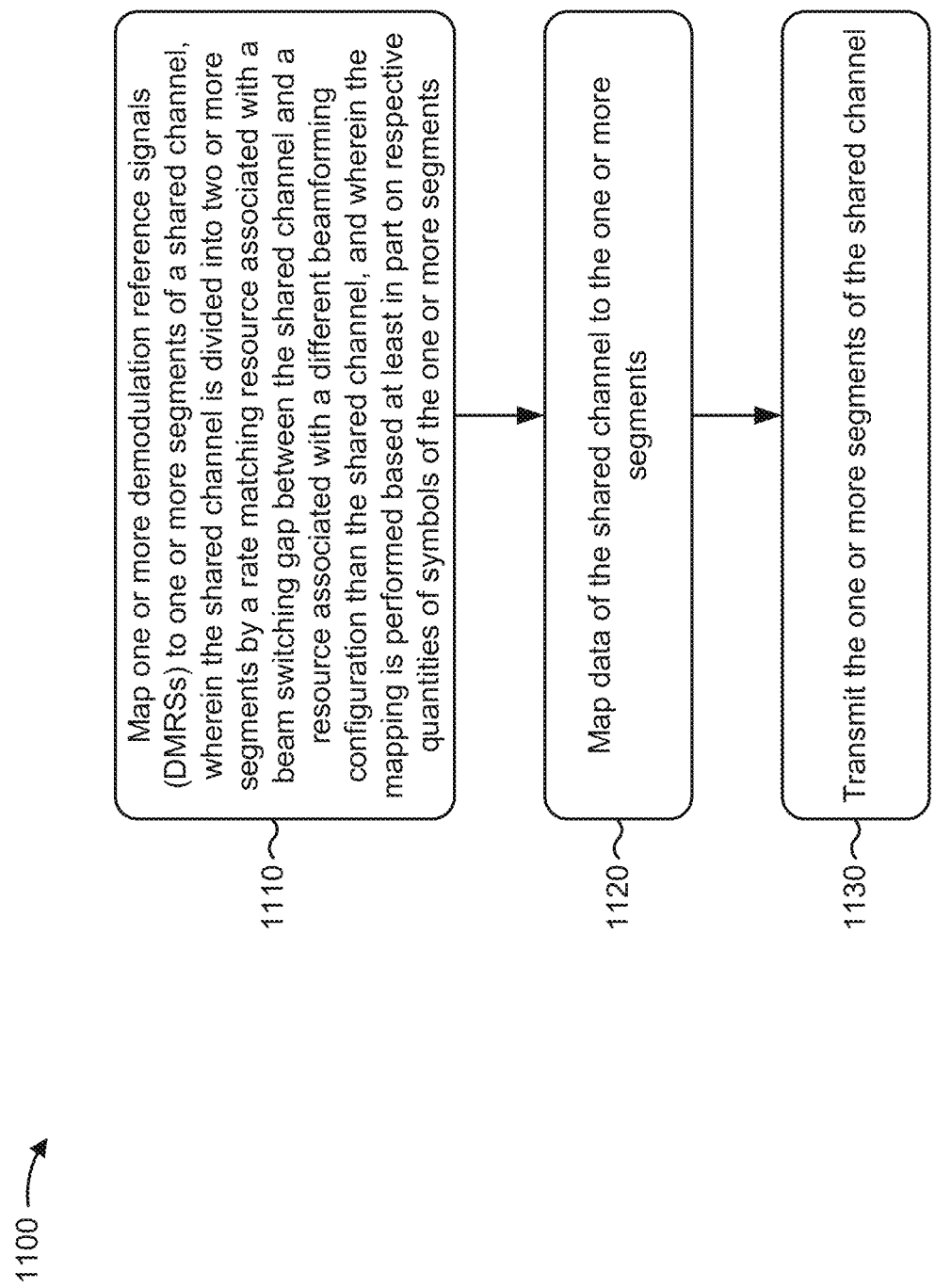
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110 and/or the like) performs operations associated with resource mapping for a beam switching gap.

As shown in FIG. 11, in some aspects, process 1100 may include mapping one or more DMRSs to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments (block 1110). For example, the base station (e.g., using controller/processor 240, transmit processor 220, TX MIMO processor 230, MOD 232, antenna 234, and/or the like) may map one or more DMRSs to one or more segments of a shared channel, as described above. In some aspects, the shared channel is divided into two or more segments by a rate matching resource associated with a beam switching gap between the shared channel and a resource associated with a different beamforming configuration than the shared channel. In some aspects, the mapping is performed based at least in part on respective quantities of symbols of the one or more segments.

As further shown in FIG. 11, in some aspects, process 1100 may include mapping data of the shared channel to the one or more segments (block 1120). For example, the base station (e.g., using controller/processor 240, transmit processor 220, TX MIMO processor 230, MOD 232, antenna 234, and/or the like) may map data of the shared channel to the one or more segments, as described above.

As further shown in FIG. 11, in some aspects, process 1100 may include transmitting the one or more segments of the shared channel (block 1130). For example, the base station (e.g., using controller/processor 240, transmit processor 220, TX MIMO processor 230, MOD 232, antenna 234, and/or the like) may transmit the one or more segments of the shared channel, as described above.

Process 1100 may include additional aspects, such as any single aspect or any combination of aspects described below and/or in connection with one or more other processes described elsewhere herein.

In a first aspect, a mini-slot based DMRS mapping technique is used to map the one or more DMRSs for all segments of the one or more segments.

In a second aspect, alone or in combination with the first aspect, a slot based DMRS mapping technique is used to map the one or more DMRSs for a first segment of the one or more segments, and a mini-slot based DMRS mapping technique is used to map the one or more DMRSs for a second segment, of the one or more segments, that occurs after the beam switching gap.

In a third aspect, alone or in combination with one or more of the first and second aspects, process 1100 includes dropping a segment, of the two or more segments, based at least in part on the segment including only one symbol in a time domain.

In a fourth aspect, alone or in combination with one or more of the first through third aspects, mapping the one or more DMRSs to the one or more segments of the shared channel further comprises: determining a location of a DMRS, of the one or more DMRSs, in a corresponding segment based at least in part on a quantity of DMRS symbols associated with the DMRS and the respective quantity of symbols of the corresponding segment.

In a fifth aspect, alone or in combination with one or more of the first through fourth aspects, the data is mapped based at least in part on one of: a first rule for which a redundancy version of the data is split over multiple segments of the shared channel, or a second rule for which the redundancy version is mapped to a single segment of the shared channel.

In a sixth aspect, alone or in combination with one or more of the first through fifth aspects, the redundancy version is split into two or more sets of code blocks that are mapped to respective segments of the multiple segments in accordance with the first rule.

In a seventh aspect, alone or in combination with one or more of the first through sixth aspects, a code block group of the data of the shared channel is mapped to a single segment of the one or more segments.

In an eighth aspect, alone or in combination with one or more of the first through seventh aspects, the one or more segments include a plurality of segments, and different redundancy versions of a transport block, including the redundancy version, are mapped to respective segments of the plurality of segments.

In a ninth aspect, alone or in combination with one or more of the first through eighth aspects, process 1100 includes determining whether mapping of the data is to be performed using the first rule or the second rule based at least in part on at least one of: an explicit indication of whether the mapping is being to be performed using the first rule or the second rule, a transport block is sizing of the shared channel, a modulation and is coding scheme of the shared channel, or a quantity of segments associated with the shared channel.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
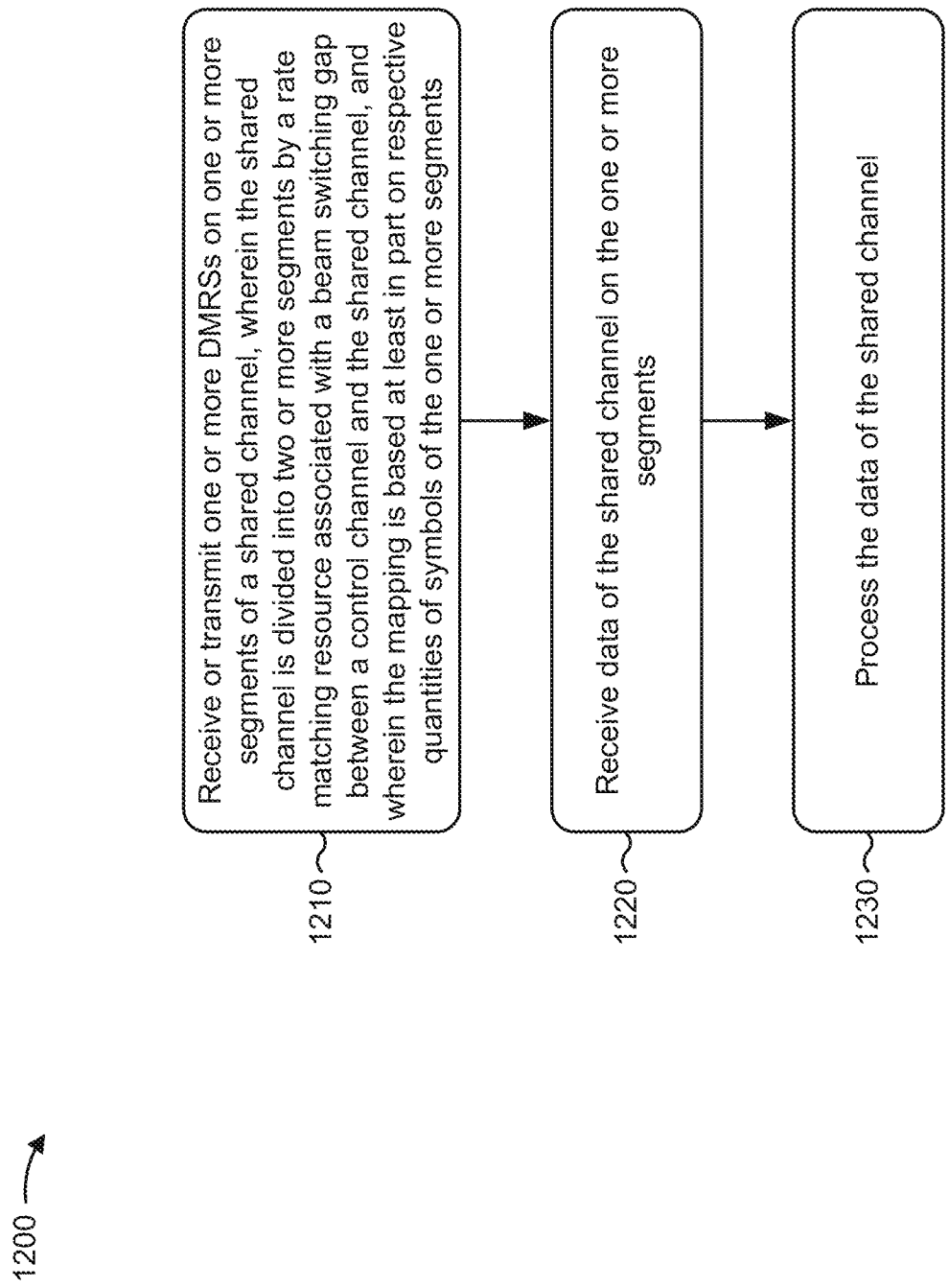
FIG. 12 is a diagram illustrating an example process performed, for example, by a user equipment, in accordance with the present disclosure.

FIG. 12 is a diagram illustrating an example process 1200 performed, for example, by a UE, in accordance with the present disclosure. Example process 1200 is an example where the UE (e.g., UE 120 and/or the like) performs operations associated with resource mapping for a beam switching gap.

As shown in FIG. 12, in some aspects, process 1200 may include receiving or transmitting one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments (block 1210). For example, the UE (e.g., using antenna 252, DEMOD 254, MIMO detector 256, receive processor 258, controller/processor 280, and/or the like) may receive or transmit one or more DMRSs on one or more segments of a shared channel, as described above. In some aspects, the shared channel is divided into two or more segments by a rate matching resource associated with a beam switching gap between the shared channel and a resource associated with a different beamforming configuration than the shared channel. In some aspects, the mapping is based at least in part on respective quantities of symbols of the one or more segments.

As further shown in FIG. 12, in some aspects, process 1200 may include receiving data of the shared channel on the one or more segments (block 1220). For example, the UE (e.g., using antenna 252, DEMOD 254, MIMO detector 256, receive processor 258, controller/processor 280, and/or the like) may receive data of the shared channel on the one or more segments, as described above.

As further shown in FIG. 12, in some aspects, process 1200 may include processing the data of the shared channel (block 1230). For example, the UE (e.g., using antenna 252, DEMOD 254, MIMO detector 256, receive processor 258, controller/processor 280, and/or the like) may process the data of the shared channel, as described above.

Process 1200 may include additional aspects, such as any single aspect or any combination of aspects described below and/or in connection with one or more other processes described elsewhere herein.

In a first aspect, a mini-slot based DMRS mapping technique is used for the one or more DMRSs for all segments of the one or more segments.

In a second aspect, alone or in combination with the first aspect, a slot based DMRS mapping technique is used for the one or more DMRSs for a first segment of the one or more segments, and a mini-slot based DMRS mapping technique is used for the one or more DMRSs for a second segment, of the one or more segments, that occurs after the beam switching gap.

In a third aspect, alone or in combination with one or more of the first and second aspects, a segment, of the two or more segments, is dropped based at least in part on the segment including only one symbol in a time domain.

In a fourth aspect, alone or in combination with one or more of the first through third aspects, a location of a DMRS, of the one or more DMRSs, in a corresponding segment is based at least in part on a quantity of DMRS symbols associated with the DMRS and the respective quantity of symbols of the corresponding segment.

In a fifth aspect, alone or in combination with one or more of the first through fourth aspects, the data is mapped based at least in part on one of: a first rule for which a redundancy version of the data is split over multiple segments of the shared channel, or a second rule for which the redundancy version is mapped to a single segment of the shared channel.

In a sixth aspect, alone or in combination with one or more of the first through fifth aspects, the redundancy version is split into two or more sets of code blocks that are mapped to respective segments of the multiple segments in accordance with the first rule.

In a seventh aspect, alone or in combination with one or more of the first through sixth aspects, a code block group of the data of the shared channel is mapped to a single segment of the one or more segments.

In an eighth aspect, alone or in combination with one or more of the first through seventh aspects, the one or more segments include a plurality of segments, and different redundancy versions of a transport block, including the redundancy version, are mapped to respective segments of the plurality of segments.

In a ninth aspect, alone or in combination with one or more of the first through eighth aspects, process 1200 includes determining whether the mapping uses the first rule or the second rule based at least in part on at least one of: an explicit indication of whether the mapping is being to be performed using the first rule or the second rule, a transport block is sizing of the shared channel, a modulation and is coding scheme of the shared channel, or a quantity of segments is associating with the shared channel.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
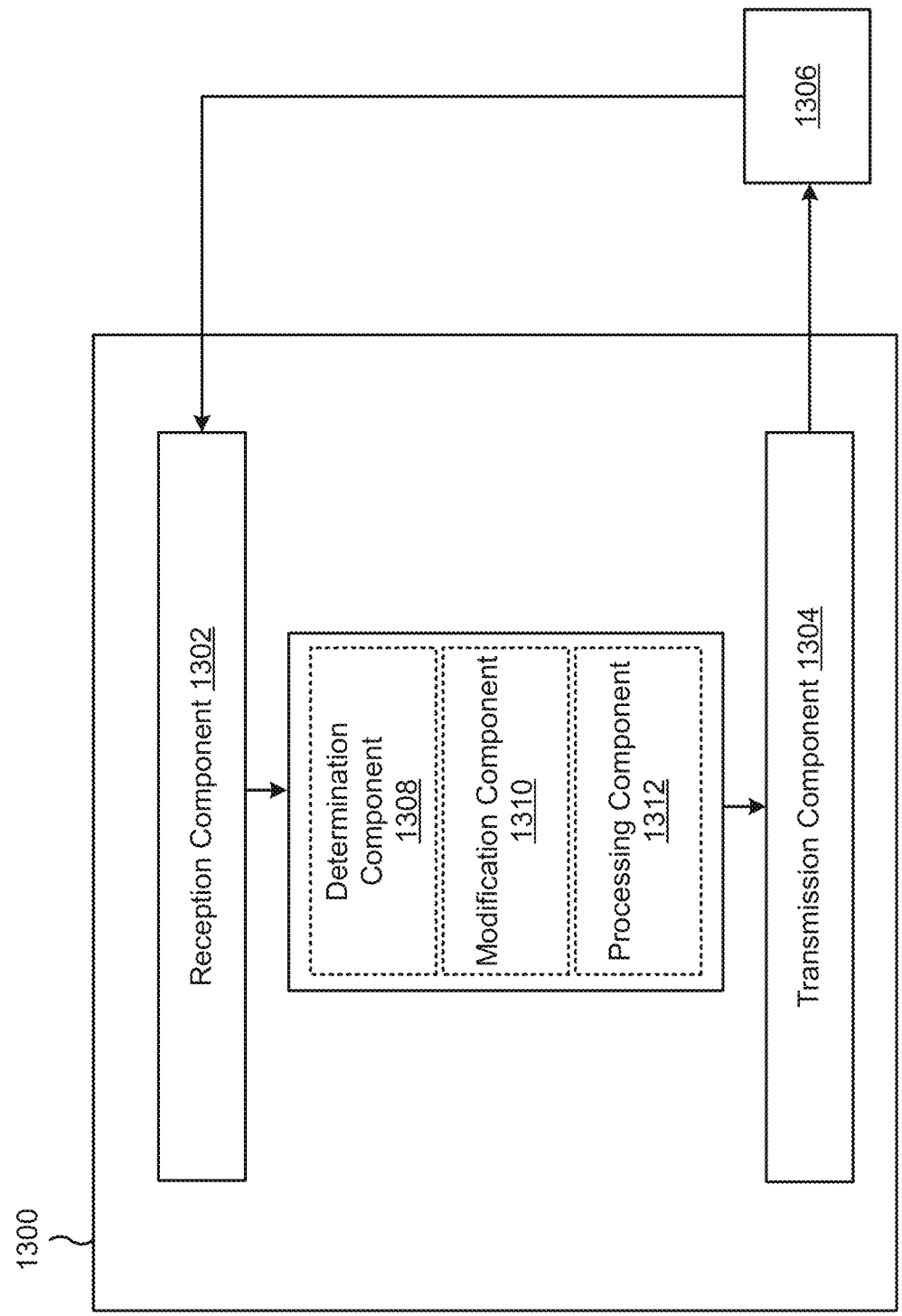
FIG. 13 is a block diagram of an example apparatus for wireless communication, in accordance with the present disclosure.

FIG. 13 is a block diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a determination component 1308, a modification component 1310, or a processing component 1312, among other examples.

In some aspects, the apparatus 1300 may be configured to perform one or more operations described herein in connection with FIGS. 3-6 and 9-10. Additionally, or alternatively, the apparatus 1300 may be configured to perform one or more processes described herein, such as process 700 of FIG. 7, process 1200 of FIG. 12, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive scheduling information that schedules a shared channel that is associated with a first beamforming configuration. The determination component 1308 may determine that a gap between the shared channel and a resource associated with a second beamforming configuration fails to satisfy a threshold, wherein the UE is configured to monitor the resource associated with the second beamforming configuration. The modification component 1310 may modify at least one of the gap to satisfy the threshold or the second beamforming configuration to match the first beamforming configuration based at least in part on determining that the gap fails to satisfy the threshold.

The reception component 1302 may receive the shared channel using a same beam as a control channel associated with the resource, based at least in part on modifying the first beamforming configuration to match the second beamforming configuration.

The reception component 1302 may receive one or more DMRSs on one or more segments of a shared channel, wherein the shared channel is divided into two or more segments by a rate matching resource associated with a beam switching gap between the shared channel and a resource associated with a different beamforming configuration than the shared channel, and wherein the mapping is based at least in part on respective quantities of symbols of the one or more segments. The reception component 1302 may receive data of the shared channel on the one or more segments. The processing component 1312 may process the data of the shared channel.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
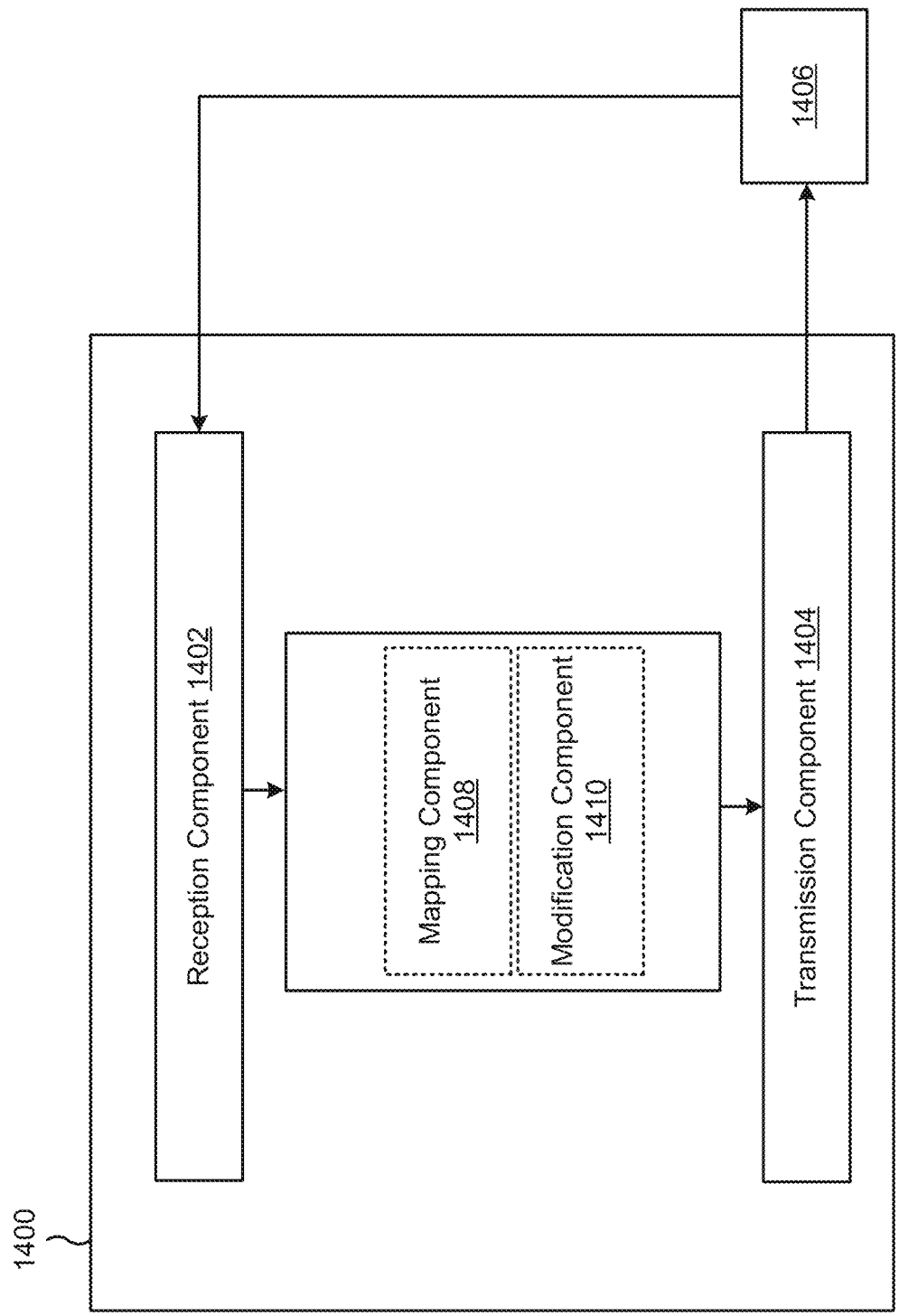
FIG. 14 is a block diagram of an example apparatus for wireless communication, in accordance with the present disclosure.

FIG. 14 is a block diagram of an example apparatus 1400 for wireless communication, in accordance with the present disclosure. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a mapping component 1408 or a modification component 1410, among other examples.

In some aspects, the apparatus 1400 may be configured to perform one or more operations described herein in connection with FIGS. 3-6 and 9-10. Additionally, or alternatively, the apparatus 1400 may be configured to perform one or more processes described herein, such as process 800 of FIG. 8, process 1100 of FIG. 11, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The mapping component 1408 may map one or more DMRSs to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments. The mapping component 1410 may map data of the shared channel to the one or more segments. The transmission component 1404 may transmit the one or more segments of the shared channel.

The reception component 1402 may drop a segment, of the two or more segments, based at least in part on the segment including only one symbol in a time domain.

The mapping component 1410 may determine whether mapping of the data is to be performed using the first rule or the second rule based at least in part on at least one of an explicit indication of whether the mapping is to be performed using the first rule or the second rule, a transport block size of the shared channel, a modulation and coding scheme of the shared channel, or a quantity of segments associated with the shared channel.

The transmission component 1404 may transmit scheduling information that schedules a shared channel that is associated with a first beamforming configuration, wherein a gap between the shared channel and a resource associated with a second beamforming configuration fails to satisfy a threshold. The modification component 1410 may modify at least one of the gap to satisfy the threshold or the first beamforming configuration to match the second beamforming configuration based at least in part on determining that the gap fails to satisfy the threshold. The transmission component 1404 may transmit the shared channel in accordance with at least one of the modified gap or the modified first beamforming configuration.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving scheduling information that schedules a shared channel that is associated with a first beamforming configuration; determining that a gap between the shared channel and a resource associated with a second beamforming configuration fails to satisfy a threshold, wherein the UE is configured to monitor the resource associated with the second beamforming configuration; and modifying at least one of the gap to satisfy the threshold or the second beamforming configuration to match the first beamforming configuration based at least in part on determining that the gap fails to satisfy the threshold.

Aspect 2: The method of Aspect 1, wherein the gap is modified, and wherein the method further comprises: switching from the second beamforming configuration to the first beamforming configuration, or from the first beamforming configuration to the second beamforming configuration, in the modified gap.

Aspect 3: The method of Aspect 1, wherein the gap is a zero-length gap based at least in part on the resource associated with the second beamforming configuration being adjacent to or overlapping, in time, a resource associated with the shared channel.

Aspect 4: The method of Aspect 3, wherein a resource associated with the shared channel overlaps the resource associated with the second beamforming configuration in at least one of time or frequency.

Aspect 5: The method of any of Aspects 1-4, wherein modifying the gap to satisfy the threshold comprises allocating one or more rate matching resources, wherein the shared channel is rate matched around the one or more rate matching resources.

Aspect 6: The method of Aspect 5, wherein a time duration of the one or more rate matching resources is based at least in part on a UE capability regarding a subcarrier spacing.

Aspect 7: The method of Aspect 5, wherein a time duration of the one or more rate matching resources is based at least in part on at least one of: a modulation and coding scheme of the shared channel or the resource, a transport block size of the shared channel or the resource, or a quantity of symbols of the shared channel.

Aspect 8: The method of Aspect 5, wherein the one or more rate matching resources are allocated starting immediately adjacent to the resource associated with the second beamforming configuration.

Aspect 9: The method of Aspect 5, wherein the one or more rate matching resources are allocated starting one or more symbols before or after the resource associated with the second beamforming configuration.

Aspect 10: The method of Aspect 9, wherein a quantity of the one or more symbols is based at least in part on at least one of: a capability of the UE, a configuration of the UE, a duration of a control resource set associated with the resource associated with the second beamforming configuration, or a quantity of symbols of the shared channel.

Aspect 11: The method of Aspect 5, wherein the shared channel is divided into a first segment and a second segment by the one or more rate matching resources, and wherein the second beamforming configuration is used for the first segment.

Aspect 12: The method of any of Aspects 1-11, further comprising: receiving the shared channel using a same beam as a control channel associated with the resource, based at least in part on modifying the first beamforming configuration to match the second beamforming configuration.

Aspect 13: The method of any of Aspects 1-12, wherein the resource associated with the second beamforming configuration is associated with a same cell as the shared channel.

Aspect 14: The method of any of Aspects 1-13, wherein the resource associated with the second beamforming configuration is associated with a different cell than the shared channel and associated with a same frequency band as the shared channel.

Aspect 15: The method of any of Aspects 1-14, wherein determining that the gap fails to satisfy the threshold is based at least in part on a scheduling offset, between the shared channel and a control channel that schedules the shared channel, satisfying a quasi-colocation switching time threshold.

Aspect 16: The method of any of Aspects 1-15, wherein the resource associated with the second beamforming configuration overlaps the shared channel in frequency, and wherein the method further comprises: rate matching the shared channel around the resource associated with the second beamforming configuration.

Aspect 17: The method of Aspect 16, wherein the shared channel is rate matched around the resource associated with the second beamforming configuration without the UE receiving signaling indicating that the shared channel is to be rate matched around the resource.

Aspect 18: The method of Aspect 16, wherein the resource associated with the second beamforming configuration is for a control channel other than a control channel that scheduled the shared channel.

Aspect 19: A method of wireless communication performed by a base station, comprising: mapping one or more demodulation reference signals (DMRSs) to one or more segments of a shared channel, wherein the shared channel is divided into two or more segments by a rate matching resource associated with a beam switching gap between the shared channel and a resource associated with a different beamforming configuration than the shared channel, and wherein the mapping is performed based at least in part on respective quantities of symbols of the one or more segments; mapping data of the shared channel to the one or more segments; and transmitting the one or more segments of the shared channel.

Aspect 20: The method of Aspect 19, wherein a mini-slot based DMRS mapping technique is used to map the one or more DMRSs for all segments of the one or more segments.

Aspect 21: The method of any of Aspects 19-20, wherein a slot based DMRS mapping technique is used to map the one or more DMRSs for a first segment of the one or more segments, and wherein a mini-slot based DMRS mapping technique is used to map the one or more DMRSs for a second segment, of the one or more segments, that occurs after the beam switching gap.

Aspect 22: The method of any of Aspects 19-21, further comprising: dropping a segment, of the two or more segments, based at least in part on the segment including only one symbol in a time domain.

Aspect 23: The method of any of Aspects 19-22, wherein mapping the one or more DMRSs to the one or more segments of the shared channel further comprises: determining a location of a DMRS, of the one or more DMRSs, in a corresponding segment based at least in part on a quantity of DMRS symbols associated with the DMRS and the respective quantity of symbols of the corresponding segment.

Aspect 24: The method of any of Aspects 19-23, wherein the data is mapped based at least in part on one of: a first rule for which a redundancy version of the data is split over multiple segments of the shared channel, or a second rule for which the redundancy version is mapped to a single segment of the shared channel.

Aspect 25: The method of Aspect 24, wherein the redundancy version is split into two or more sets of code blocks that are mapped to respective segments of the multiple segments in accordance with the first rule.

Aspect 26: The method of Aspect 24, wherein a code block group of the data of the shared channel is mapped to a single segment of the one or more segments.

Aspect 27: The method of Aspect 24, wherein the one or more segments include a plurality of segments, and wherein different redundancy versions of a transport block, including the redundancy version, are mapped to respective segments of the plurality of segments.

Aspect 28: The method of Aspect 24, further comprising: determining whether mapping of the data is to be performed using the first rule or the second rule based at least in part on at least one of: an explicit indication of whether the mapping is to be performed using the first rule or the second rule, a transport block size of the shared channel, a modulation and coding scheme of the shared channel, or a quantity of segments associated with the shared channel.

Aspect 29: An apparatus for wireless communication at a device, comprising a processor; memory coupled with the processor; and instructions stored in the memory and executable by the processor to cause the apparatus to perform the method of one or more Aspects of Aspects 1-28.

Aspect 30: A device for wireless communication, comprising a memory and one or more processors coupled to the memory, the memory and the one or more processors configured to perform the method of one or more Aspects of Aspects 1-28.

Aspect 31: An apparatus for wireless communication, comprising at least one means for performing the method of one or more Aspects of Aspects 1-28.

Aspect 32: A non-transitory computer-readable medium storing code for wireless communication, the code comprising instructions executable by a processor to perform the method of one or more Aspects of Aspects 1-28.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving scheduling information that schedules a shared channel that is associated with a first beamforming configuration;
   determining that a gap between the shared channel and a control resource set resource associated with a second beamforming configuration fails to satisfy a threshold, wherein the UE is configured to monitor the control resource set resource associated with the second beamforming configuration; and
   modifying, based at least on the determination that the gap fails to satisfy the threshold, at least one of:
     the gap to satisfy the threshold; or
     or the second beamforming configuration to match the first beamforming configuration.

2. The method of claim 1, wherein the gap is modified, and wherein the method further comprises:
   switching from the second beamforming configuration to the first beamforming configuration, or from the first beamforming configuration to the second beamforming configuration, in the modified gap.

3. The method of claim 1, wherein the gap is a zero-length gap based at least on the control resource set resource associated with the second beamforming configuration being adjacent to or overlapping, in time, a resource associated with the shared channel.

4. The method of claim 3, wherein a resource associated with the shared channel overlaps the control resource set resource associated with the second beamforming configuration in at least one of time or frequency.

5. The method of claim 1, wherein modifying the gap to satisfy the threshold comprises allocating one or more rate matching resources, wherein the shared channel is rate matched around the one or more rate matching resources.

6. The method of claim 5, wherein a time duration of the one or more rate matching resources is based at least on a UE capability regarding a subcarrier spacing.

7. The method of claim 5, wherein a time duration of the one or more rate matching resources is based at least on at least one of:
   a modulation and coding scheme of the shared channel or the control resource set resource,
   a transport block size of the shared channel or the control resource set resource, or
   a quantity of symbols of the shared channel.

8. The method of claim 5, wherein the one or more rate matching resources are allocated starting immediately adjacent to the control resource set resource associated with the second beamforming configuration.

9. The method of claim 5, wherein the one or more rate matching resources are allocated starting one or more symbols before or after the control resource set resource associated with the second beamforming configuration.

10. The method of claim 9, wherein a quantity of the one or more symbols is based at least on at least one of:
    a capability of the UE,
    a configuration of the UE,
    a duration of a control resource set associated with the control resource set resource associated with the second beamforming configuration, or
    a quantity of symbols of the shared channel.

11. The method of claim 5, wherein the shared channel is divided into a first segment and a second segment by the one or more rate matching resources, and wherein the second beamforming configuration is used for the first segment.

12. The method of claim 1, further comprising:
    receiving the shared channel using a same beam as a control channel associated with the control resource set resource, based at least on modifying the first beamforming configuration to match the second beamforming configuration.

13. The method of claim 1, wherein the control resource set resource associated with the second beamforming configuration is associated with a same cell as the shared channel.

14. The method of claim 1, wherein the control resource set resource associated with the second beamforming configuration is associated with a different cell than the shared channel and associated with a same frequency band as the shared channel.

15. The method of claim 1, wherein determining that the gap fails to satisfy the threshold is based at least on a scheduling offset, between the shared channel and a control channel that schedules the shared channel, satisfying a quasi-colocation switching time threshold.

16. The method of claim 1, wherein the control resource set resource associated with the second beamforming configuration overlaps the shared channel in frequency, and wherein the method further comprises:
rate matching the shared channel around the control resource set resource associated with the second beamforming configuration.

17. The method of claim 16, wherein the shared channel is rate matched around the control resource set resource associated with the second beamforming configuration without the UE receiving signaling indicating that the shared channel is to be rate matched around the control resource set resource.

18. The method of claim 16, wherein the control resource set resource associated with the second beamforming configuration is for a control channel other than a control channel that scheduled the shared channel.

19. A method of wireless communication performed by a base station, comprising:
mapping one or more demodulation reference signals (DMRSs) to one or more segments of a shared channel, wherein the shared channel is divided into two or more segments by a rate matching resource associated with a beam switching gap between the shared channel and a control resource set resource associated with a different beamforming configuration than the shared channel, and wherein the mapping is performed based at least on respective quantities of symbols of the one or more segments;
mapping data of the shared channel to the one or more segments; and
transmitting the one or more segments of the shared channel.

20. The method of claim 19, wherein a mini-slot based DMRS mapping technique is used to map the one or more DMRSs for all segments of the one or more segments.

21. The method of claim 19, wherein a slot based DMRS mapping technique is used to map the one or more DMRSs for a first segment of the one or more segments, and wherein a mini-slot based DMRS mapping technique is used to map the one or more DMRSs for a second segment, of the one or more segments, that occurs after the beam switching gap.

22. The method of claim 19, further comprising:
dropping a segment, of the two or more segments, based at least on the segment including only one symbol in a time domain.

23. The method of claim 19, wherein mapping the one or more DMRSs to the one or more segments of the shared channel further comprises:
determining a location of a DMRS, of the one or more DMRSs, in a corresponding segment based at least on a quantity of DMRS symbols associated with the DMRS and the respective quantity of symbols of the corresponding segment.

24. The method of claim 19, wherein the data is mapped based at least on one of:

a first rule for which a redundancy version of the data is split over multiple segments of the shared channel, or
a second rule for which the redundancy version is mapped to a single segment of the shared channel.

25. The method of claim 24, wherein the redundancy version is split into two or more sets of code blocks that are mapped to respective segments of the multiple segments in accordance with the first rule.

26. The method of claim 24, wherein a code block group of the data of the shared channel is mapped to a single segment of the one or more segments.

27. The method of claim 24, wherein the one or more segments include a plurality of segments, and wherein different redundancy versions of a transport block, including the redundancy version, are mapped to respective segments of the plurality of segments.

28. The method of claim 24, further comprising:
determining whether mapping of the data is to be performed using the first rule or the second rule based at least on at least one of:
an explicit indication of whether the mapping is to be performed using the first rule or the second rule,
a transport block size of the shared channel,
a modulation and coding scheme of the shared channel, or
a quantity of segments associated with the shared channel.

29. A method of wireless communication performed by a base station, comprising:
transmitting scheduling information that schedules a shared channel that is associated with a first beamforming configuration, wherein a gap between the shared channel and a control resource set resource associated with a second beamforming configuration fails to satisfy a threshold;
modifying, based at least on determining that the gap fails to satisfy the threshold, at least one of:
the gap to satisfy the threshold;
or the first beamforming configuration to match the second beamforming configuration; and
transmitting the shared channel in accordance with at least one of the modified gap or the modified first beamforming configuration.

30. A method of wireless communication performed by a user equipment (UE), comprising:
receiving one or more demodulation reference signals (DMRSs) on one or more segments of a shared channel, wherein the shared channel is divided into two or more segments by a rate matching resource associated with a beam switching gap between the shared channel and a control resource set resource associated with a different beamforming configuration than the shared channel, and wherein the shared channel is divided based at least on respective quantities of symbols of the one or more segments;
receiving data of the shared channel on the one or more segments; and
processing the data of the shared channel.

* * * * *